US011682393B2

(12) United States Patent
Jain et al.

(10) Patent No.: US 11,682,393 B2
(45) Date of Patent: Jun. 20, 2023

(54) METHOD AND SYSTEM FOR CONTEXT ASSOCIATION AND PERSONALIZATION USING A WAKE-WORD IN VIRTUAL PERSONAL ASSISTANTS

(71) Applicant: Samsung Electronics Co., Ltd., Gyeonggi-do (KR)

(72) Inventors: Anoop Jain, Noida (IN); Praveen Sonare, Noida (IN); Arun Kumar, Noida (IN); Ashwani Kathuria, Noida (IN)

(73) Assignee: Samsung Electronics Co., Ltd

( * ) Notice: Subject to any disclaimer, the term of this patent is extended or adjusted under 35 U.S.C. 154(b) by 306 days.

(21) Appl. No.: 17/001,088

(22) Filed: Aug. 24, 2020

(65) Prior Publication Data
US 2021/0056970 A1    Feb. 25, 2021

(30) Foreign Application Priority Data

Aug. 22, 2019 (IN) .............................. 201911033916

(51) Int. Cl.
*G10L 15/22*    (2006.01)
*G06F 16/242*    (2019.01)
*G10L 15/18*    (2013.01)

(52) U.S. Cl.
CPC ............ *G10L 15/22* (2013.01); *G06F 16/243* (2019.01); *G10L 15/1822* (2013.01); *G10L 2015/223* (2013.01)

(58) Field of Classification Search
None
See application file for complete search history.

(56) References Cited

U.S. PATENT DOCUMENTS

| 9,711,148 | B1 * | 7/2017 | Sharifi | .................... G10L 17/04 |
| 9,734,825 | B2 * | 8/2017 | Kennewick | ............. G10L 15/22 |
| 10,049,675 | B2 * | 8/2018 | Haughay | ................. G10L 15/22 |

(Continued)

FOREIGN PATENT DOCUMENTS

| CN | 107135247 | 9/2017 |
| KR | 1020180073493 | 7/2018 |
| WO | WO 2017/222503 | 12/2017 |

OTHER PUBLICATIONS

Indian Examination Report dated Apr. 23, 2021 issued in counterpart application No. 201911033916, 5 pages.

(Continued)

*Primary Examiner* — Jonathan C Kim
(74) *Attorney, Agent, or Firm* — The Farrell Law Firm, P.C.

(57) ABSTRACT

An electronic device for generating a personalized response from a virtual assistant includes a network communication circuitry; a memory; and at least one processor configured to, when receiving a user query including a wake-word, parse the user query to separate the wake-word from the user query; process the wake-word; extract wake-word related information from a wake-word database; parse the extracted wake-word related information along with a plurality of user preference information; classify information received from a wake-word parser; produce a wake-word context from the classified information; process the user query; and retrieve a query response from at least one knowledge base based on a plurality of action steps.

19 Claims, 22 Drawing Sheets

(56) References Cited

U.S. PATENT DOCUMENTS

| | | | | |
|---|---|---|---|---|
| 10,152,973 | B2* | 12/2018 | Hoffmeister | G10L 15/32 |
| 10,705,794 | B2* | 7/2020 | Gruber | G10L 15/22 |
| 2014/0310001 | A1* | 10/2014 | Kalns | G10L 15/30 704/270.1 |
| 2014/0372126 | A1* | 12/2014 | Ady | G10L 25/48 704/270.1 |
| 2015/0032443 | A1* | 1/2015 | Karov | G06F 40/30 704/9 |
| 2015/0186156 | A1* | 7/2015 | Brown | H04L 51/02 715/706 |
| 2015/0302856 | A1* | 10/2015 | Kim | G10L 15/22 704/273 |
| 2015/0371663 | A1* | 12/2015 | Gustafson | G10L 25/51 704/270.1 |
| 2016/0021105 | A1* | 1/2016 | Pellom | H04L 63/105 726/7 |
| 2016/0077794 | A1* | 3/2016 | Kim | G10L 15/20 704/275 |
| 2017/0068550 | A1* | 3/2017 | Zeitlin | G10L 15/285 |
| 2017/0242657 | A1* | 8/2017 | Jarvis | G06F 3/165 |
| 2018/0012593 | A1* | 1/2018 | Prasad | G10L 15/08 |
| 2018/0096690 | A1* | 4/2018 | Mixter | G10L 21/0216 |
| 2018/0108343 | A1* | 4/2018 | Stevans | G10L 13/00 |
| 2018/0182398 | A1* | 6/2018 | Halstvedt | G06F 16/3329 |
| 2018/0190278 | A1* | 7/2018 | Gupta | G10L 15/22 |
| 2018/0197439 | A1* | 7/2018 | Gordon | G09B 19/04 |
| 2018/0293484 | A1* | 10/2018 | Wang | G06F 16/632 |
| 2018/0293981 | A1* | 10/2018 | Ni | G10L 17/22 |
| 2018/0366114 | A1* | 12/2018 | Anbazhagan | G06F 3/167 |
| 2019/0012444 | A1* | 1/2019 | Lesso | G06F 21/32 |
| 2019/0051307 | A1* | 2/2019 | Knudson | G10L 15/22 |
| 2019/0066670 | A1* | 2/2019 | White | G10L 15/28 |
| 2019/0196779 | A1* | 6/2019 | Declerck | G10L 15/08 |
| 2020/0184967 | A1* | 6/2020 | Gupta | G06F 3/167 |
| 2021/0056970 | A1* | 2/2021 | Jain | G10L 15/1822 |
| 2021/0183397 | A1* | 6/2021 | Liu | H04L 51/52 |
| 2022/0115016 | A1* | 4/2022 | Whalin | G10L 15/08 |

OTHER PUBLICATIONS https://docs.snips.ai/articles/platform/wakeworld/multiple-wakewords.

International Search Report dated Nov. 20, 2020 issued in counterpart application No. PCT/KR2020/010863, 10 pages.

European Search Report dated Jun. 9, 2022 issued in counterpart application No. 20855303.2-1203, 8 pages.

* cited by examiner

FIG. 1A
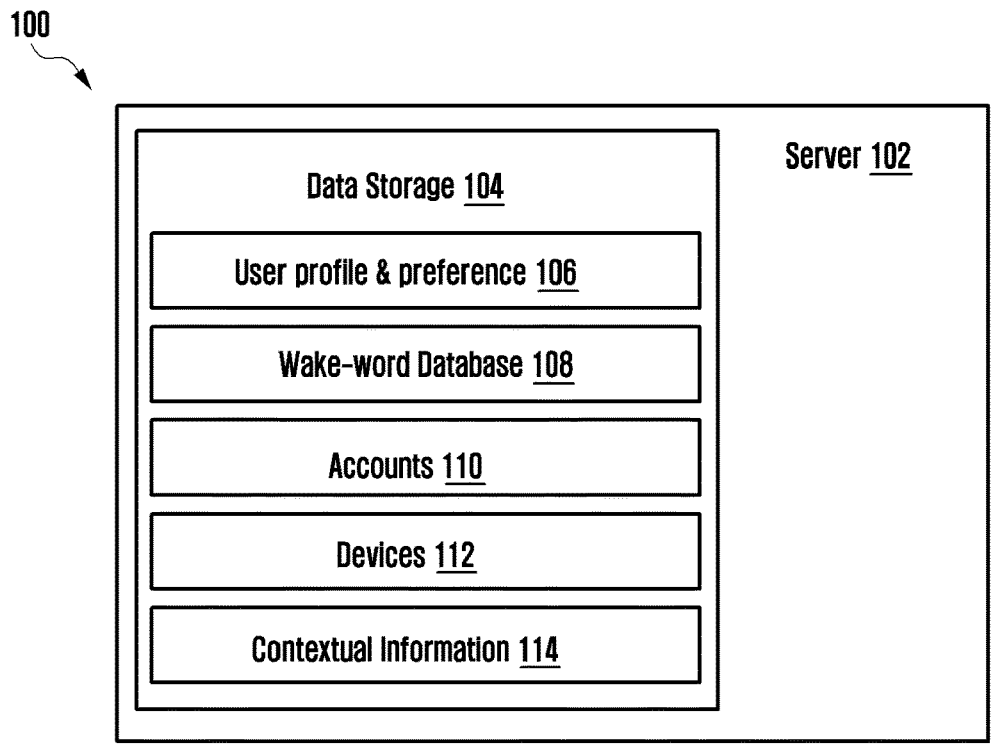
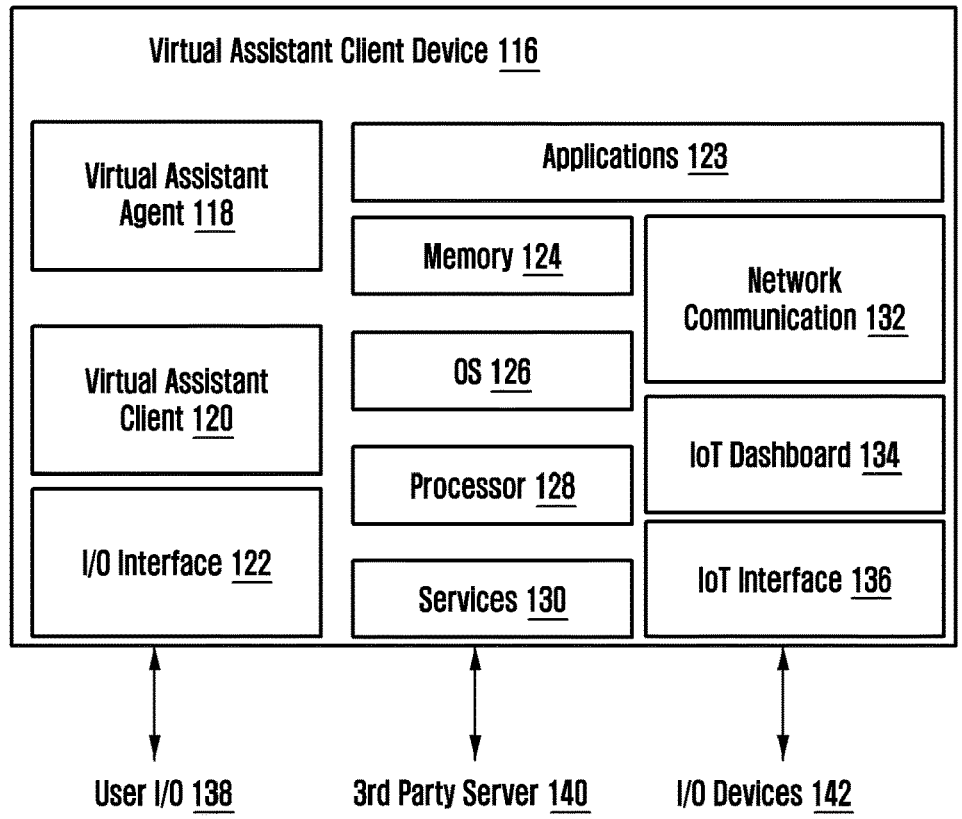

FIG. 1B
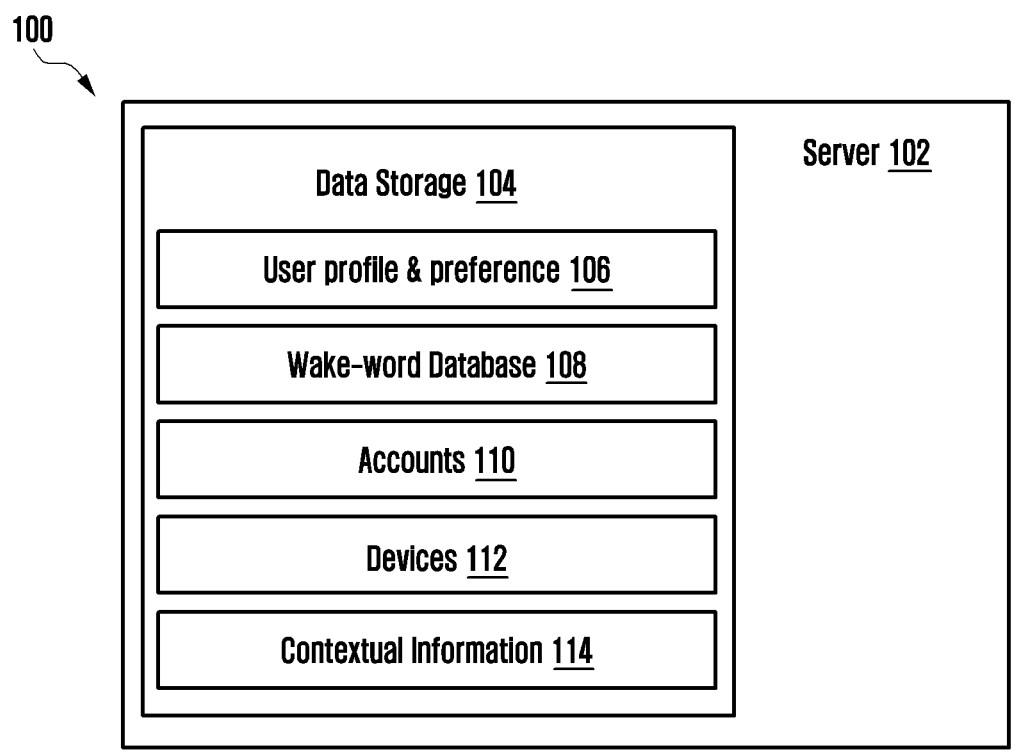
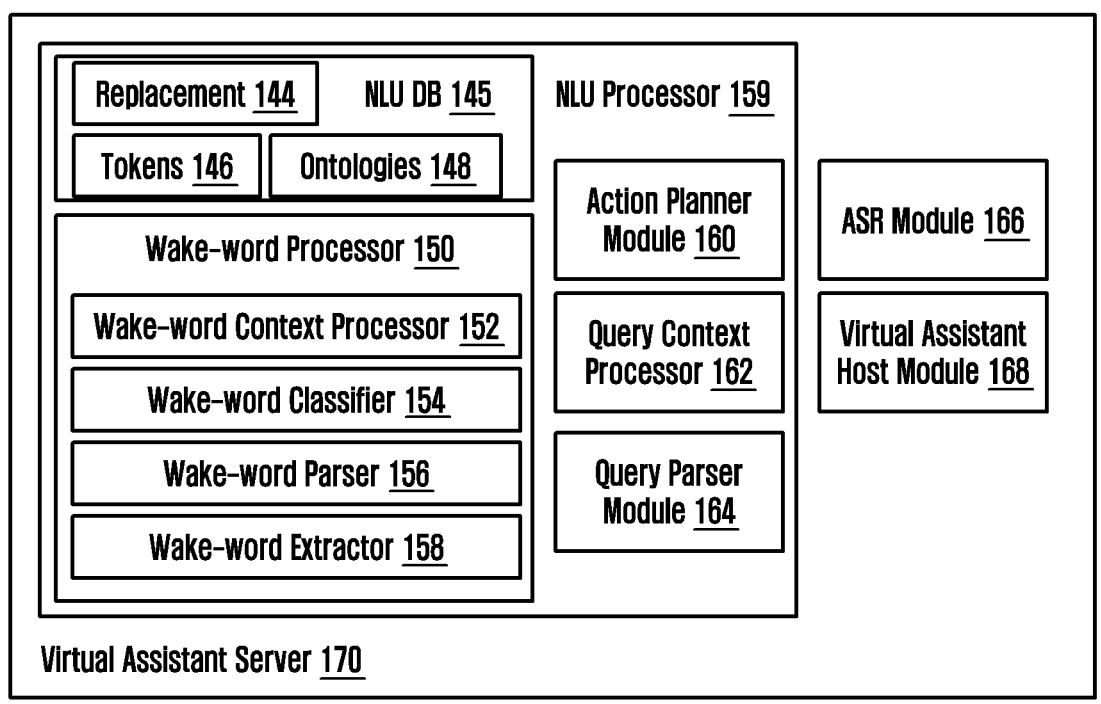

FIG. 2A
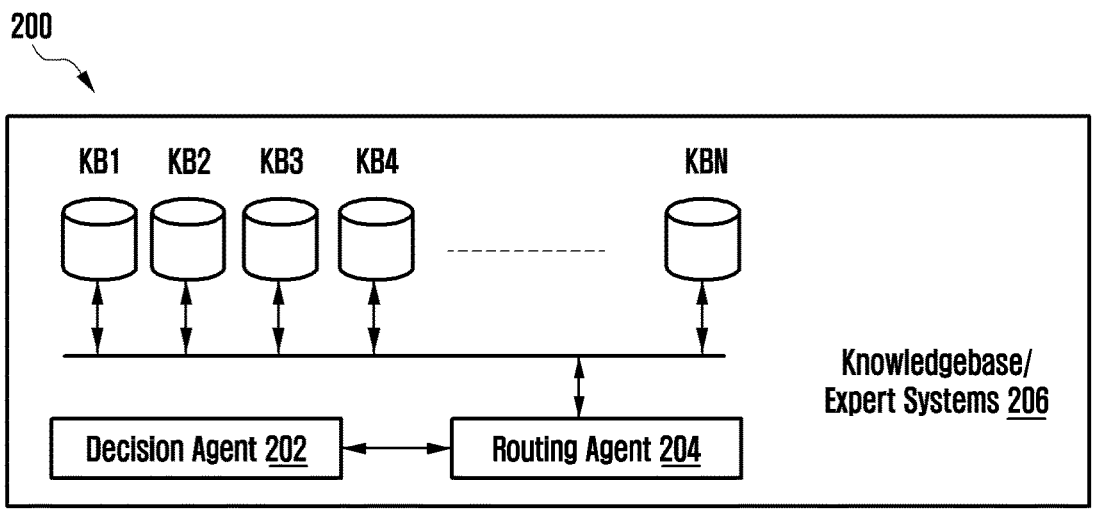
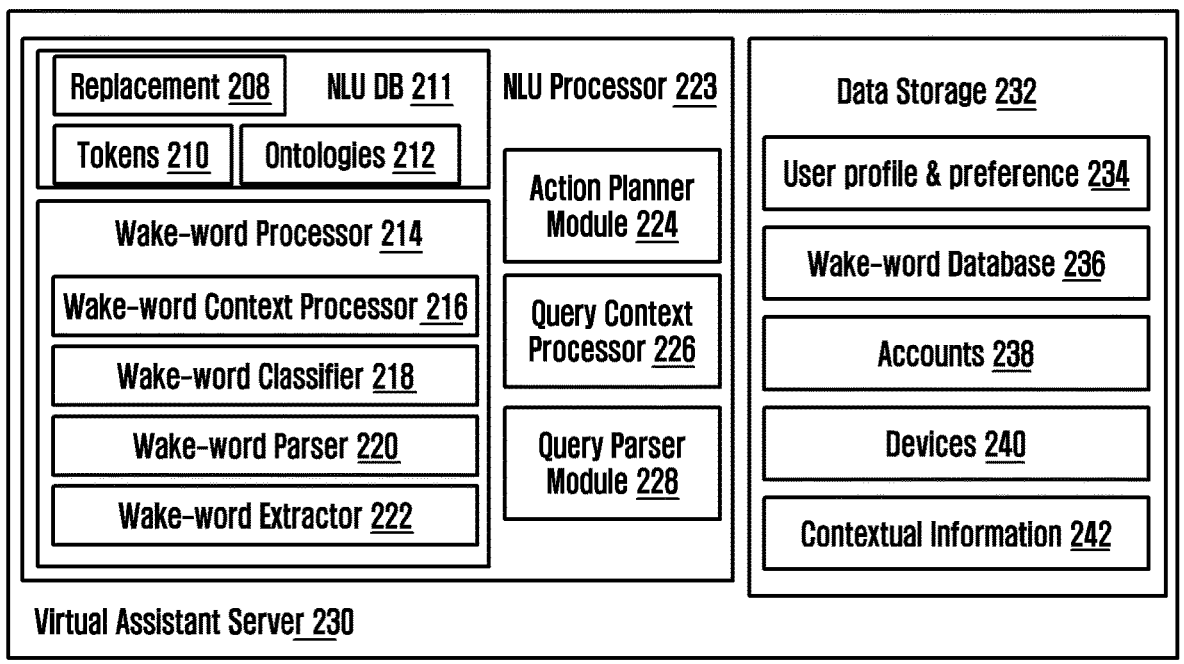

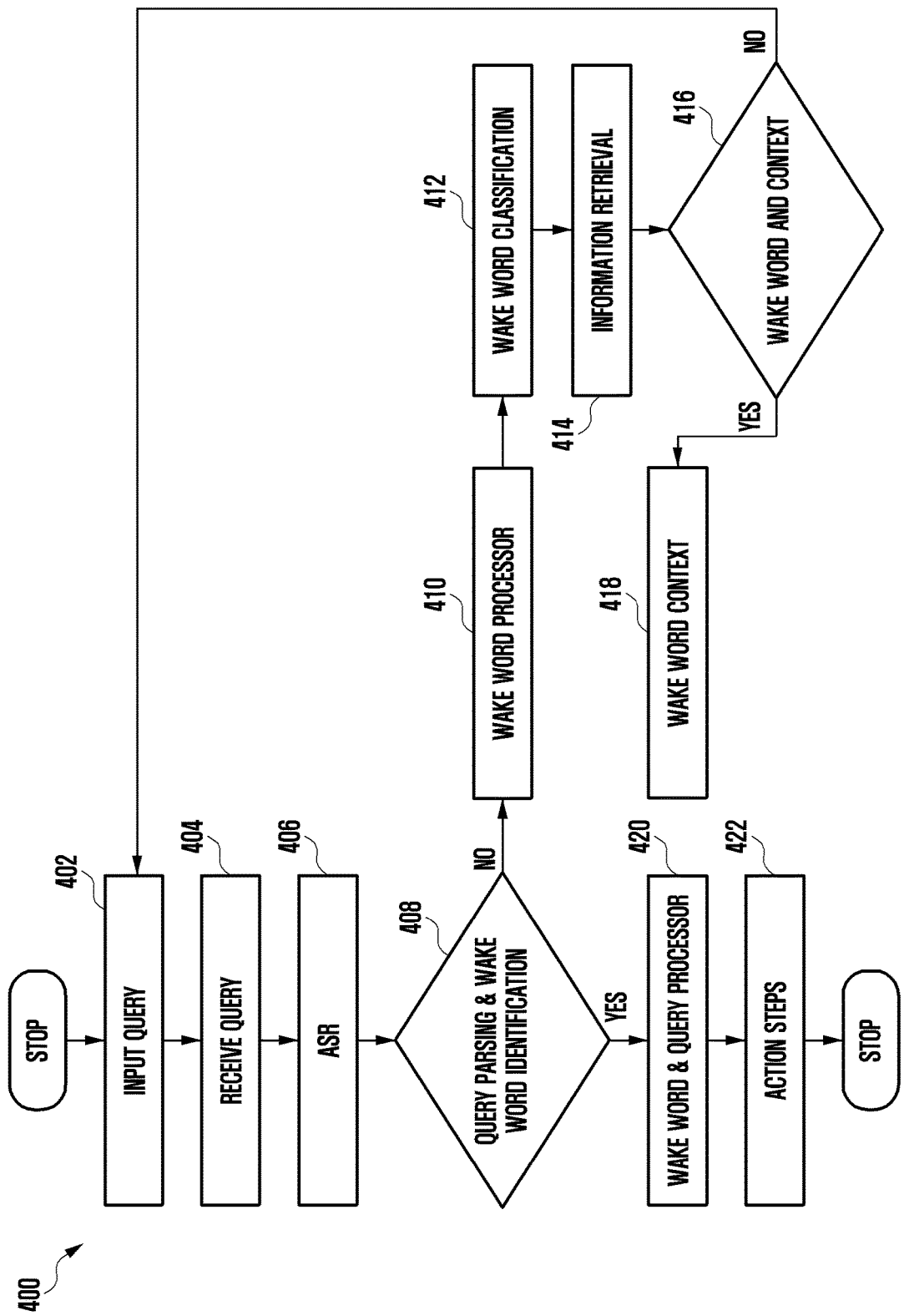

METHOD AND SYSTEM FOR CONTEXT ASSOCIATION AND PERSONALIZATION USING A WAKE-WORD IN VIRTUAL PERSONAL ASSISTANTS

CROSS-REFERENCE TO RELATED APPLICATION(S)

This application is based on and claims priority under 35 U.S.C. § 119 to Indian Patent Application No. 201911033916, filed on Aug. 22, 2019, in the Indian Intellectual Property Office, the disclosure of which is incorporated by reference herein in its entirety.

BACKGROUND

1. Field

The present disclosure relates generally to interacting with virtual personal assistants, and more particularly to invoking a knowledge base and providing a personalized response in a virtual personal assistant communication.

2. Description of Related Art

Virtual personal assistants are computing devices that provide an improved interface between a user and a computer. Such an assistant allows users to interact with the device or system using a natural language in speech and/or text form. Such an assistant interprets user queries, executes the user's intent in the queries, performs actions in support of these queries and generates a response to the user.

A virtual personal assistant can be used with various sources of information for processing a user input, including for example, a knowledge base, model and/or data. In many cases, the user input without assistance is not sufficient to clearly identify the user's intention and the task one wants to perform. This can occur because of noise in the input stream of individual differences between users and/or the inherent ambiguity of the natural language. Thus, without additional information, a virtual assistant is unable to correctly interpret and process a request. This type of ambiguity can lead to errors, incorrect execution of actions and/or excessive encumbrance user requests to enter the clarification.

According to a conventional technique, a user may have to repeatedly ask questions to a virtual assistant to receive an adequate response. For example, the user may ask a question to a virtual personal assistant and the virtual personal assistant may reply back and need more clarity on the question. The user again may ask the question to the virtual assistant with more clarity. Further, additional keywords may be added to a search, and after that the virtual assistant may again ask for more clarity about the user's question and again the user may add more detail to his or her question. Hence, after multiple steps, the user may get the desired answer from his virtual personal assistant. Thus, multiple inputs, which can be repetitive and burdensome to the user, may be required by the system to get the context required to process the query and generate a response.

Thus, it may be advantageous to provide a personalized response from virtual personal assistants, and to reduce the time consumed in information retrieval in virtual personal assistants.

SUMMARY

The present disclosure has been made to address the above-mentioned problems and disadvantages, and to provide at least the advantages described below.

In accordance with an aspect of the present disclosure, a method for generating a personalized response from a virtual assistant includes receiving, by a virtual assistant client device, a user query comprising a wake-word; parsing, by a query parser module, the user query for separating the wake-word from the user query; processing, by a wake-word processor, the wake-word in a virtual assistant server; wherein the processing comprises extracting, by a wake-word extractor residing on the virtual assistant server, wake-word related information from a wake-word database; parsing, by a wake-word parser, the extracted wake-word related information along with a plurality of user preference information; classifying, by a wake-word classifier, information received from the wake-word parser; producing, by a wake-word context processor, a wake-word context from the classified information; processing, by the virtual assistant server, the user query; and retrieving, by the virtual assistant server, a query response from at least one knowledge base based on a plurality of action steps.

In accordance with another aspect of the present disclosure, an electronic device for generating a personalized response from a virtual assistant includes a network communication circuitry; a memory; and at least one processor configured to, when receiving a user query including a wake-word, parse the user query to separate the wake-word from the user query; process the wake-word; extract wake-word related information from a wake-word database; parse the extracted wake-word related information along with a plurality of user preference information; classify information received from a wake-word parser; produce a wake-word context from the classified information; process the user query; and retrieve a query response from at least one knowledge base based on a plurality of action steps.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1A illustrates a system comprising the virtual assistant client device configured to initialize a wake-word, receive a user input, and act as an interface device for a user for generation of a personalized response from a virtual assistant, according to an embodiment;

FIG. 1B illustrates a system comprising the virtual assistant server configured to process the user query and the wake-word for generation of a personalized response from a virtual assistant, according to an embodiment;

FIG. 2A illustrates an architecture for context association and personalization using a wake-word in virtual personal assistants, according to an embodiment;

FIG. 4 is a flowchart illustrating wake-word processing, wake-word classification and information retrieval of wake-words, according to an embodiment;

DETAILED DESCRIPTION

Figure 1C:
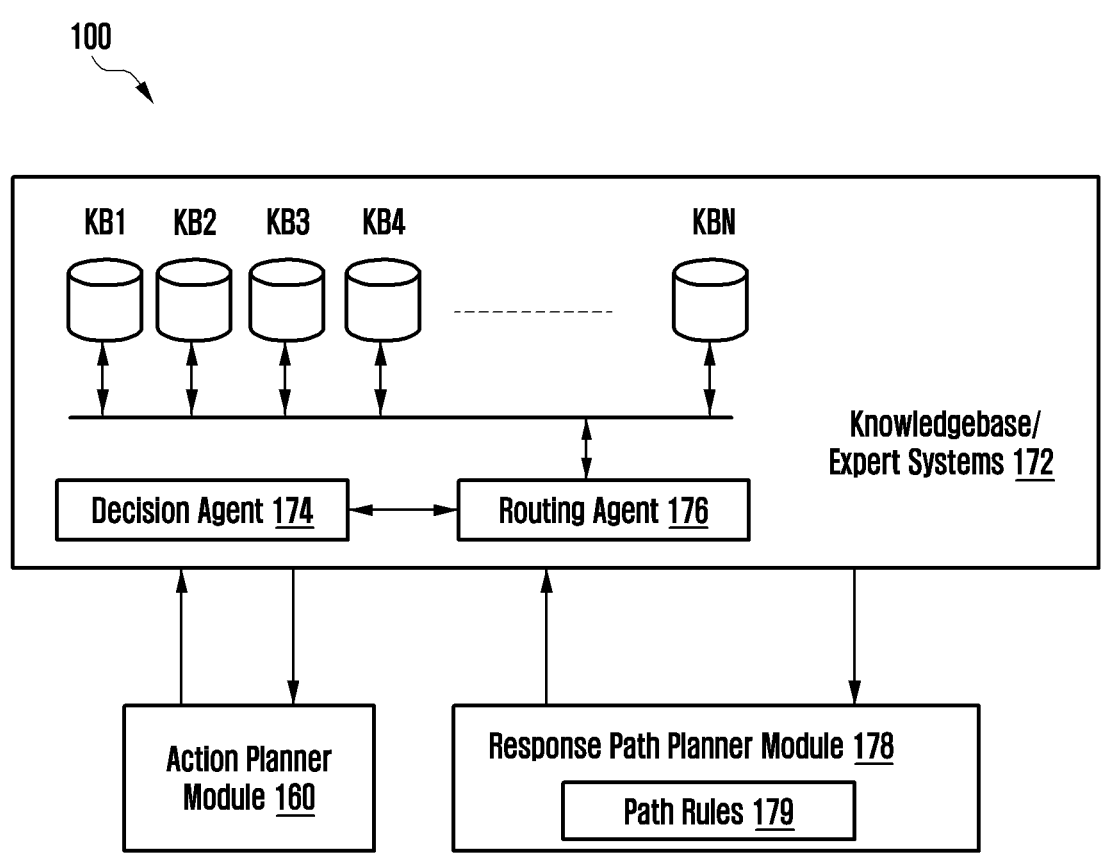
FIG. 1C illustrates a system configured to retrieve a query response for generation of a personalized response from a virtual assistant, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Connections between components and/or modules within the drawings are not intended to be limited to direct connections. Rather, these components and modules may be modified, re-formatted or otherwise changed by intermediary components and modules.

The various embodiments of the present disclosure provide a method and system for generation of a personalized response from a virtual personal assistant. The disclosure relates to mechanisms for providing knowledge base invocation and personalized response generation based on wake-words and a set of personalization parameters in communication of a virtual personal assistant.

The present claimed subject matter provides an improved method and a system for generation of a personalized response from a virtual personal assistant.

For example, various embodiments herein may include one or more methods and systems for rapid downloading and reproducing of content in a client-server arrangement. In one of the embodiments, the method includes receiving a user query comprising a wake-word by a virtual assistant client device. Further, the user query is parsed for separating the wake-word from the user query by a query parser module. The wake-word in a virtual assistant server is processed by a wake-word processor. The processing further comprises extracting the wake-word related information from a wake-word database by a wake-word extractor residing on a virtual assistant server. The extracted wake-word related information is parsed along with a plurality of user preference information by a wake-word parser. The information received from the wake-word parser is classified by a wake-word classifier. Further, the wake-word context is produced from the classified information by a wake-word context processor. The method further includes processing the user query by the virtual assistant server and retrieving a query response from at least one knowledge base based on a plurality of action steps by the virtual assistant server. The method further includes generating a standard natural language response from the query response received from a response path planner module by a standard response generator and synthesizing a personalized response from the standard natural language response using wake-word information and wake-word context by a personalized response generator.

In an embodiment, the system includes a virtual assistant client device configured to receive a user query comprising a wake-word. Further, a query parser module is configured to parse the user query to separate the wake-word from the user query. A wake-word processor is configured to process the wake-word in a virtual assistant server, wherein the wake-word processor further comprises a wake-word extractor residing on a virtual assistant server configured to extract the wake-word related information from a wake-word database. A wake-word parser is configured to parse the extracted wake-word related information along with a plurality of user preference information. A wake-word classifier is further configured to classify information received from the wake-word parser. Further, a wake-word context processor is configured to produce the wake-word context from the classified information. The system further includes the virtual assistant server which is configured to process the user query and retrieve a query response from at least one knowledge base based on a plurality of action steps. The system further includes a standard response generator configured to generate a standard natural language response from the query response received from a response path planner module and a personalized response generator configured to synthesize a personalized response from the standard natural language response using wake-word information and a wake-word context.

In an embodiment, the system further includes a standard response generator that generates a standard natural language response from the query response received from a response path planner module and a personalized response generator that synthesizes a personalized response from the standard natural language response using wake-word information and the wake-word context.

In an embodiment, the virtual assistant server comprises a query context processor that generates the user query context from the wake-word context and the separated user query and an action planner module configured to compute the plurality of action steps based on the user query context.

In an embodiment, the plurality of action steps includes a decision agent that is configured to receive the plurality of action steps from the action planner module, search for the appropriate knowledge base from the user query, extract the query response to the user query from the searched appropriate knowledge base and instruct sending the query response to the response path planner module.

In an embodiment, the same virtual assistant can be used on different devices. The user assigns a wake-word with a particular knowledge base. The user asks his personalized virtual personal assistant a query, such as, "Hi Bob. I am bored, play a good video". If the user has the wake-word "Bob" in all the devices in his vicinity, then all the devices in his vicinity will wake from the wake word and send the query to the cloud for further processing. In the cloud, since the same query is received from all the different devices using same account of the user, the best suitable device present will receive a reply back. Hence, in such scenarios, the best suitable device present in the vicinity of the user is selected based on the user query.

In an embodiment, filler sources like Facebook™, Instagram™, Twitter™, Netflix™ or Prime Video™ are used for fetching the information such as likes and dislikes, tweets, and watch history of the user.

In an embodiment, different virtual assistants are used on different devices. In this instance, the user assigns a wake-word with a particular knowledge base. Each device has a different virtual assistant and each virtual assistant is associated with different wake-words. The user has multiple virtual assistants in different devices around him. So as the query comes from the user, only a cloud corresponding to a device starts processing and the device starts responding.

In an embodiment, the method includes searching the user query in the plurality of knowledge bases by the decision agent and preparing a routing plan for searching the query response in one of the plurality of knowledge bases based on the plurality of action steps by a routing agent. Further, the user query is routed to the appropriate knowledge base for getting the query response by the routing agent.

In an embodiment, the plurality of wake-words are assigned corresponding to at least one mode from a plurality of modes, wherein the plurality of modes include a general mode and a private mode.

It will be appreciated that those skilled in the art will be able to devise various arrangements that, although not explicitly described herein, embody principles of the present disclosure. Furthermore, all examples recited herein are principally intended for explanatory purposes to help the reader in understanding the principles and concepts of the disclosure and are to be construed as being without limitation to such specifically recited examples and conditions. Moreover, all statements herein reciting principles, aspects, and embodiments of the disclosure, as well as specific examples thereof, are intended to encompass equivalents thereof.

FIG. 1A illustrates a system 100 comprising the virtual assistant client device 116 configured to initialize a wake-word, receive a user input, act as an interface device for the user for generation of a personalized response from a virtual assistant, according to an embodiment. The system 100 includes a server 102, a virtual assistant client device 116, a user input/output 138, a third party server 140, and a plurality of input/output devices 142.

The server 102 may include a proxy server, a mail server, a web server, an application server, a real-time communication server, and a file transfer protocol (FTP) server.

Data storage 104 may be implemented as an enterprise database, a remote database, and a local database. Further, the data storage 104 may include multiple devices and may be located either within the vicinity of each other or may be located at different geographic locations. Furthermore, the data storage 104 may be implemented inside or outside the system 100 and the data storage 104 may be implemented as a single database. Further, the data storage 104 may reside in the virtual assistant client device 116.

The virtual assistant client device 116 may be referred to as a virtual assistant, a personal assistant, a virtual assistant device, or a virtual personal assistant.

The server 102 includes the data storage 104. The data storage 104 includes the user profile information and the user preference information 106. The server 102 further includes the wake-word database 108, the accounts information 110, the devices 112, and the contextual information 114.

The virtual assistant client device 116 includes a virtual assistant agent 118, a virtual assistant client 120, an input/output interface 122, one or more applications 123, a memory 124 coupled to the processor 128, an operating system (OS) 126, one or more services 130, a network communication 132, an IoT dashboard 134, and an IoT interface 136.

The memory 124 can include any computer-readable medium known in the art including, for example, volatile memory, such as static random access memory (SRAM) and dynamic random access memory (DRAM), and/or non-volatile memory, such as read only memory (ROM), erasable programmable ROM (EPROM), flash memories, hard disks, optical disks, and magnetic tapes.

The processor 128 may be implemented as one or more microprocessors, microcomputers, microcontrollers, digital signal processors, central processing units, neural processing units, state machines, logic circuitries, and/or any devices that manipulate signals based on operational instructions. Among other capabilities, the processor(s) is configured to fetch and execute computer-readable instructions stored in a memory 124.

The network communication 132 interconnects the virtual assistant client device 116 with and the data storage 104 in the server 102. The network communication 132 includes wired and wireless networks. Examples of the wired networks include, but are not limited to, a wide area network (WAN) or a local area network (LAN), a client-server network, and a peer-to-peer network. Examples of the wireless networks include, but are not limited to, wireless fidelity (Wi-Fi), a global system for a mobile communications (GSM) network, and a general packet radio service (GPRS) network, an enhanced data GSM environment (EDGE) network, 802.5 communication networks, code division multiple access (CDMA) networks, or Bluetooth networks. The network communication 132 may be a combination of one or more wired and/or wireless networks.

Referring to FIG. 1A, the system 100 performs wake-word initialization for generating a personalized response from the virtual assistant. Here, the wake-word initialization is required to map the wake-word with a user defined knowledge base. This mapping, along with the user profile and preference 106, is stored in the data storage 104 to produce an efficient response of the user query while interacting with user. The user provides the wake-word and the user preferences 106 using the virtual assistant client 120 and the virtual assistant server maps it to the plurality of knowledge bases. This information consists of a user's profile (i.e. profile_ID), a wake-word and the knowledge base, wherein this information is sent to the data storage 104 at the server 102. The system 100 further requests the data storage 104 to setup a new wake word for the user. Further, the data storage 104 present at the server 102 is configured to receive the user request and to add an entry in the wake-word database 108. Additionally, the data storage 104 may also be present in the virtual assistant server or the virtual assistant client device 116. This entry includes information such as the profile_ID, the wake-word and the knowledge base information, and the combination of the profile_ID and the wake-word may be the primary key. After the inclusion of the wake-word in the wake-word database, a success/failure response is sent back to the virtual assistant client device 116. The virtual assistant agent 118 is configured to receive the response from the server 102 and to present the response to the user using an I/O interface 122. The user will input the query including the wake-word to process it further.

According to an embodiment, a User1 initializes a plurality of wake-words along with knowledge base information using a handheld device according, for example, to the following command:

Initialize(wake word: Tom, knowledge base: Information)

Further, the entry is added with respect to User1 in the wake-word database according to the following command:

Insert(profile_ID: User1, Wake word: Tom, Knowledge base: Information)

Accordingly, the result of wake word initialization is displayed on the handheld device.

FIG. 1B illustrates a system comprising the virtual assistant server configured to process the user query and the wake-word for generation of a personalized response from a virtual assistant, according to an embodiment.

Referring to FIG. 1B, the virtual assistant server 170 includes a natural language understanding (NLU) processor 159, an automated speech recognition (ASR) module 166 and a virtual assistant host module 168. The NLU processor 159 further includes an NLU database 145, a wake-word processor 150, an action planner module 160, a query context processor 162 and a query parser module 164. The NLU database 145 further includes a replacement unit 144, a plurality of tokens 146 and a plurality of ontologies 148. The wake-word processor 150 includes a wake-word context processor 152, a wake-word classifier 154, a wake-word parser 156 and a wake-word extractor 158.

The user query is received by the virtual assistant host module 168 residing in the virtual assistant server 170 from the virtual assistant client 120 of the virtual assistant client device 116. This user query contains the wake-word along with rest of the user query. The virtual assistant host module 168 is configured to pass this user query to the ASR module 166. The ASR module 166 is further configured to process the incoming user query. The ASR module 166 is configured to take an acoustic signal as an input and determine which words were actually spoken based on the acoustic signal. An output consists of a word graph which includes a lattice that consists of word hypotheses (i.e., estimate). The ASR module 166 is further configured to return the text results, wherein each result involves a certain level of confidence, and to pass this data to the NLU processor 159. The NLU processor 159 is configured to receive this data and to extract a meaningful representation. The NLU processor 159 is further configured to handle a plurality of unstructured inputs and to convert it to machine understandable structured form. Initially, the query is parsed to separate the wake-word and rest of the user query. Further, the wake-word is sent to the wake-word processor 150 and rest of the user query is parsed separately.

The user query is processed by the query parser module 164 as per the standard natural language understanding methodology, and one such method is explained herein. In the first step of the standard natural language understanding methodology, the query words in the user query are replaced with standard words that the machine can easily comprehend. These query words are stored in the replacement files 144 in the NLU database 145. In the next step, the standard query is prepared by using the one of the ontologies 148 and the token information 146 stored in the NLU database 145. This user query contains a context regarding the conversation with the user. The context may include user profile information for generating better contextual queries. Additionally, processing the user query may require grammar pruning and processing, rules filtering, cloning, and restriction filtering.

The wake-word is sent to the wake-word processor 150 for further processing. The wake-word processor 150 receives the wake-word from the query parser module 164 to generate the wake-word context. The wake-word processing includes various steps which are explained herein. In the first step, the incoming wake-word query is generated to extract information about the wake word by the wake-word extractor 158 from the wake-word database 108 residing in the server 102. The wake-word related information is stored in the wake-word database 108. The extraction is generally done through the plurality of application program interface (API) calls that includes the user ID, device ID and the wake-word as the input. The server 102 is configured to return the wake-word information and user preference information in response to one of the API calls. In the second step, the wake-word parser 156 is configured to receive the user preference information stored in user profile and the wake-word relation information from the wake-word extractor 158. Further, the information received from the server 102 can be in the form of a data structure or any standard data format. The wake-word parser 156 is further configured to parse this information to group related information with each other and to aggregate or acquire contextual information 114. In the third step, the wake-word classifier 154 is configured to classify the information received from wake-word parser 156, and the wake-word classifier 154 groups similar information received from the plurality of user preferences 106 and the wake-word database 108. The wake-word classifier 154 is further configured to assign a plurality of tokens 146 or tags to the information received from the user preference and wake-word database. These tags or tokens 146 are accessed from the NLU database 145. The wake-word classifier 154 may also support in interpreting a context along with classification task. In the final step, the wake-word context processor 152 is configured to process the classified information received from the wake-word classifier 154 to extract a specific context related to the wake-word. The wake-word context processor 152 is further configured to generate the context in a standard language similar to the output of the query parser module 164 such that the context and the output of the query parser module 164 can be processed together. This contextual information along with the links to the knowledge base are sent to the query context processor 162.

The query context processor 162 is configured to receive the query from the query parser module 164, and the wake-word context processor 152 is configured to receive wake-word contextual information along with links to the knowledge base to generate the overall context of the query. This is done by mapping and traversing through connected information and generating a plurality of machine readable queries as an output. The query context processor 162 includes a reasoning component or an inference engine for combining the information received from the query parser module 164 and the contextual information received from the wake-word context processor 152 to interpret and generate an aggregated context.

The action planner module 160 is configured to define a plurality of action steps to process the response to the user query, break down a contextual query into a plurality of action steps, and execute these steps as a script. The plurality of action steps includes some interlinked or connected steps and the execution of these action steps are defined by the action planner module 160. Further, the links to the knowledge base and the external sources are also defined in these action steps. One such example of the action steps is shown below.

Sample action steps may have a script including the following command steps:
1. Go to Decision Agent 1 [Path to Decision Agent]
2. Search GK Knowledge base [path_info_GK] and Geography Knowledge base [path_info_Geography] for query "Amazon"
3. Instruct Decision Agent 1 to send search result to Response Path Planner with [Wake Word, Wake-word_Info]

FIG. 1C illustrates a system configured to retrieve a query response for generation of a personalized response from a virtual assistant, according to an embodiment.

Referring to FIG. 1C, the decision agent 174 acts as an interface between the virtual assistant server 170 and the domain specific knowledge base 172. The decision agent 174 may also work in coordination with an expert system 172 responsible for the domain knowledge base. When an action plan is received by the decision agent 174 from the action planner module 160, the decision agent 174 is configured to identify the respective knowledge base or expert system 172 through which the user query is processed. A plurality of queries are then forwarded to the knowledge base or expert system 172 to extract a response/action to the queries. Extracted responses are received by the decision agent 174, which is configured to generate a consolidated coherent response to the user query, which is then forwarded to a response path planner module 178 for further processing. There are certain cases where the queries are interdependent on each other, in such cases the decision agent 174 is configured to pass this information to a routing agent 176. The routing agent 176 is configured to prepare a routing plan for searching a query response in one of the plurality of knowledge bases 172 based on the plurality of action steps. Each knowledge base 172 stores a table that resolves the path to the dependent knowledge base using a routing table mechanism.

Figure 1D:
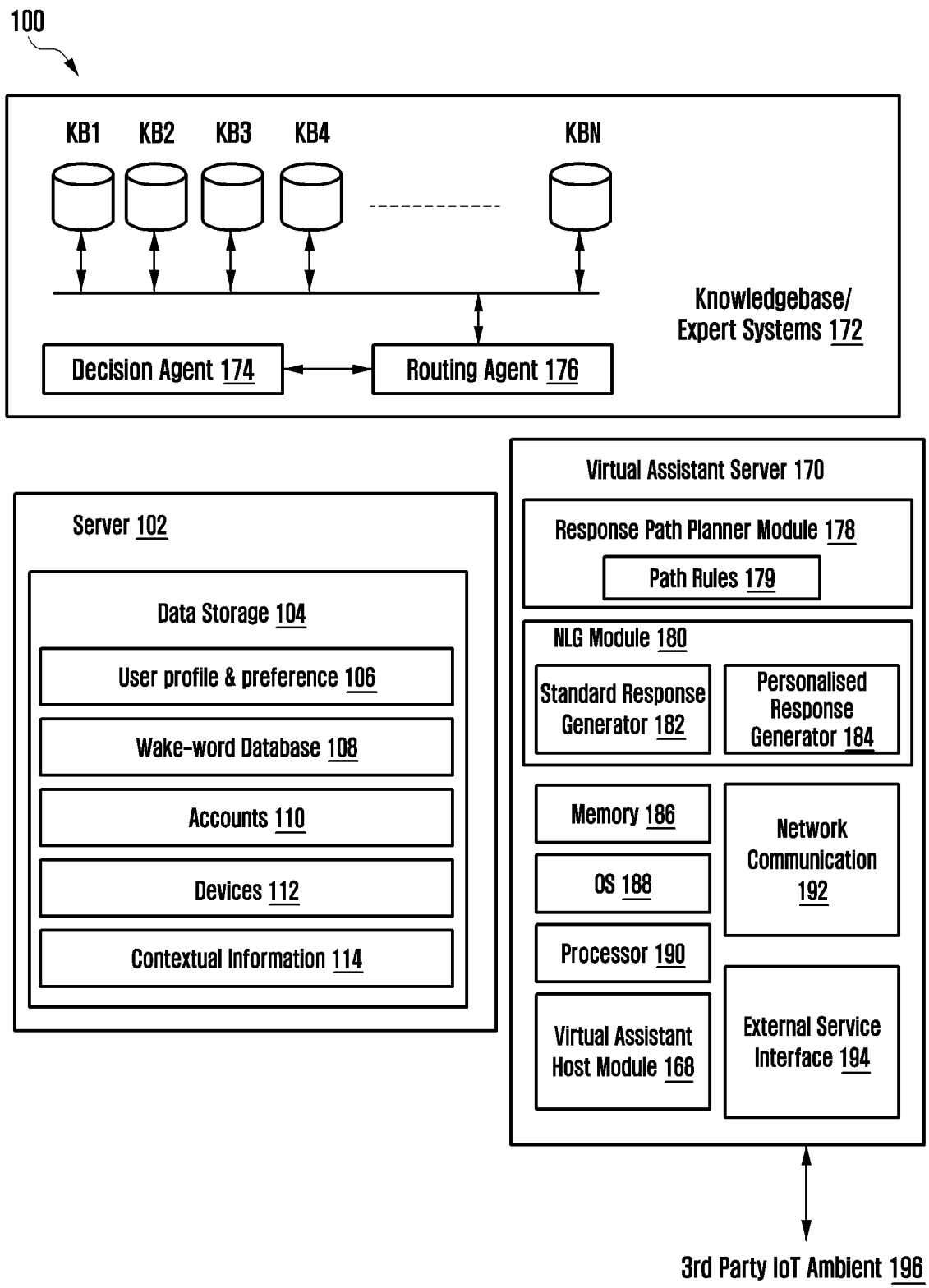
FIG. 1D illustrates a system configured to generate a personalized response from a virtual assistant, according to an embodiment.

FIG. 1D illustrates a system configured to generate a personalized response from a virtual assistant, according to an embodiment.

Referring to FIG. 1D, the virtual assistant server 170 further comprises a response path planner module 178, a natural language generation (NLG) module 180, a memory 186, an OS 188, one or more processors 190, a virtual assistant host module 168, network communication circuitry 192 and an external service interface 194. As explained in FIG. 1C, the generated consolidated coherent response to the user query is forwarded to the response path planner module 178 for further processing. The response path planner module 178 is configured to receive the response from the decision agent 174 and to prepare an execution plan for response. This execution plan is prepared with rules defined in a path rules database 179. This response path may include a verbal/non-verbal response to be generated for user execution of commands, device control commands, service interaction instructions, and user interface (UI) generation instructions. Further, the NLG module 180 is configured to generate the response in the user's own language for a verbal/non-verbal response. The NLG module 180 includes a personalized response generation based on the user preference for providing companionship experience to the user. The personalized response generation involves two major components including a standard response generator 182 and a personalized response generator 184. The standard response generator 182 includes various sub-modules including a response retrieval module configured to receive a response from the knowledge base 172 and path instructions from the response path planner module 178. This information may come in the form of different information units. Further, a dialogue manager module is configured to filter the information received from the response retrieval module and to generate abstract answers for the user queries. Further, a response synthesis module is configured to receive abstract textual answers and to convert them into standard, human understandable answers. This module interacts with various verbal and ontological databases to perform this task.

The personalized response generator 184 is configured to receive a standard textual response from the standard response generator 182 and to convert them into a personalized response. The personalized response generator 184 includes various sub-modules. A wake-word context extractor module is configured to interact with the virtual assistant server 170 or the wake-word processor 150 in the NLU processor 159 and to extract the contextual information related to the wake-word. The wake-word context extractor module processes the information related to type of interaction, voice choices, and user preferences. For example, a user assigns wake-word "Tom" for "information" purposes to have a companion which talks in a casual way. A personalized response constructor module is configured to receive information from the wake-word context extractor and the standard response generator 182 and to convert the information into a personalized response. This information may include user vocabulary/interaction information from a user profile, word replacement information and word adaptation information. This conversion of information can also be done by maintaining different word profiles based on types of conversations. A personalized response generated for a profile of Tom may include the recitation, "Hey [User], Amazon is just like the place you always wanted to visit, it is a tropical rainforest, that's also the world's largest". Finally, a text-to-speech converter module is configured to convert the generated personalized text response to speech in a desired voice (i.e., male or female) using one of the standard talk to speech (TTS) techniques.

FIG. 2A illustrates an architecture for context association and personalization using a wake-word in virtual personal assistants, according to an embodiment.

Figure 2B:
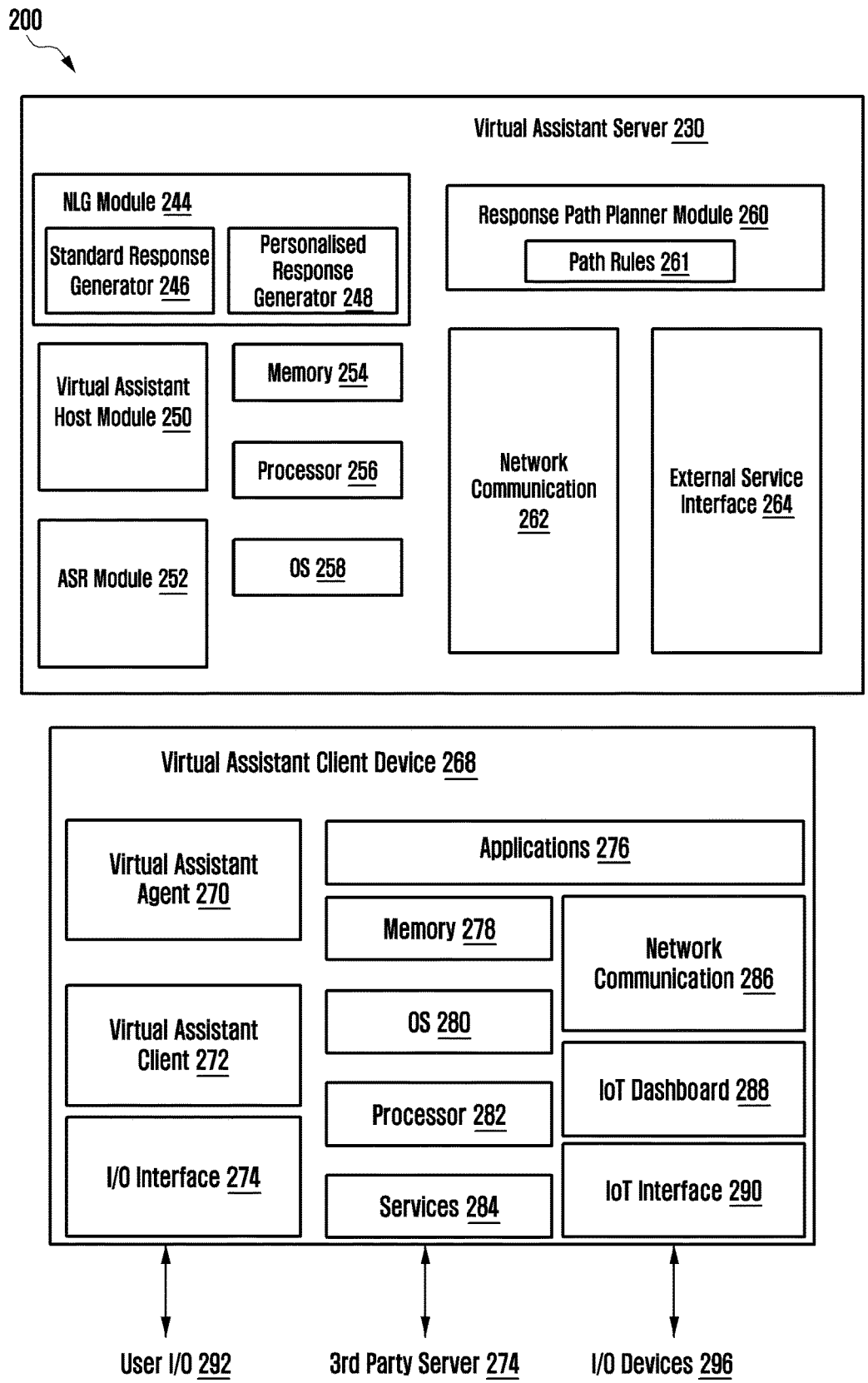
FIG. 2B illustrates an architecture for context association and personalization using a wake-word in virtual personal assistants, according to an embodiment.

FIG. 2B illustrates an architecture for context association and personalization using a wake-word in virtual personal assistants, according to an embodiment.

The architecture illustrated in FIG. 2B may be in furtherance of the architecture illustrated in FIG. 2A.

Referring to FIGS. 2A-2B, the system 200 includes a virtual assistant client device 268, a user input/output 292, a third party server 294, a plurality of input/output devices 296, a virtual assistant server 230, a knowledge base/expert system 206 and a third party IoT ambient unit. In the present implementation, the virtual assistant server 230 includes an NLU processor 223, a data storage 232, an NLG module 244, a virtual assistant host module 250, an ASR module 252, a memory 254, one or more processors 256, an OS 258, a response path planner module 260, a network communication 262 and an external service interface 264. The NLU processor 223 further includes an NLU database 211, a wake-word processor 214, an action planner module 224, a query context processor 226 and a query parser module 228. The NLU database 211 further includes a replacement unit 208, a plurality of tokens 210 and a plurality of ontologies 212. The wake-word processor 214 includes a wake-word context processor 216, a wake-word classifier 218, a wake-word parser 220 and a wake-word extractor 222.

The virtual assistant client device 268 includes a virtual assistant agent 270, a virtual assistant client 272, an input/output interface 274, one or more applications 276, a memory 278 coupled to the processor 282, an OS 280, one or more services 284, a network communication 286, an Internet of things (IoT) dashboard 288, and an IoT interface 290.

The user data is stored in the data storage 232 residing in the virtual assistant server 230 instead of a separate server. The data storage 232 includes the user profile information and the user preference information 234. The data storage 232 further includes the wake-word database 236, the accounts information 238, the devices 240, and the contextual information 242.

Figure 3A:
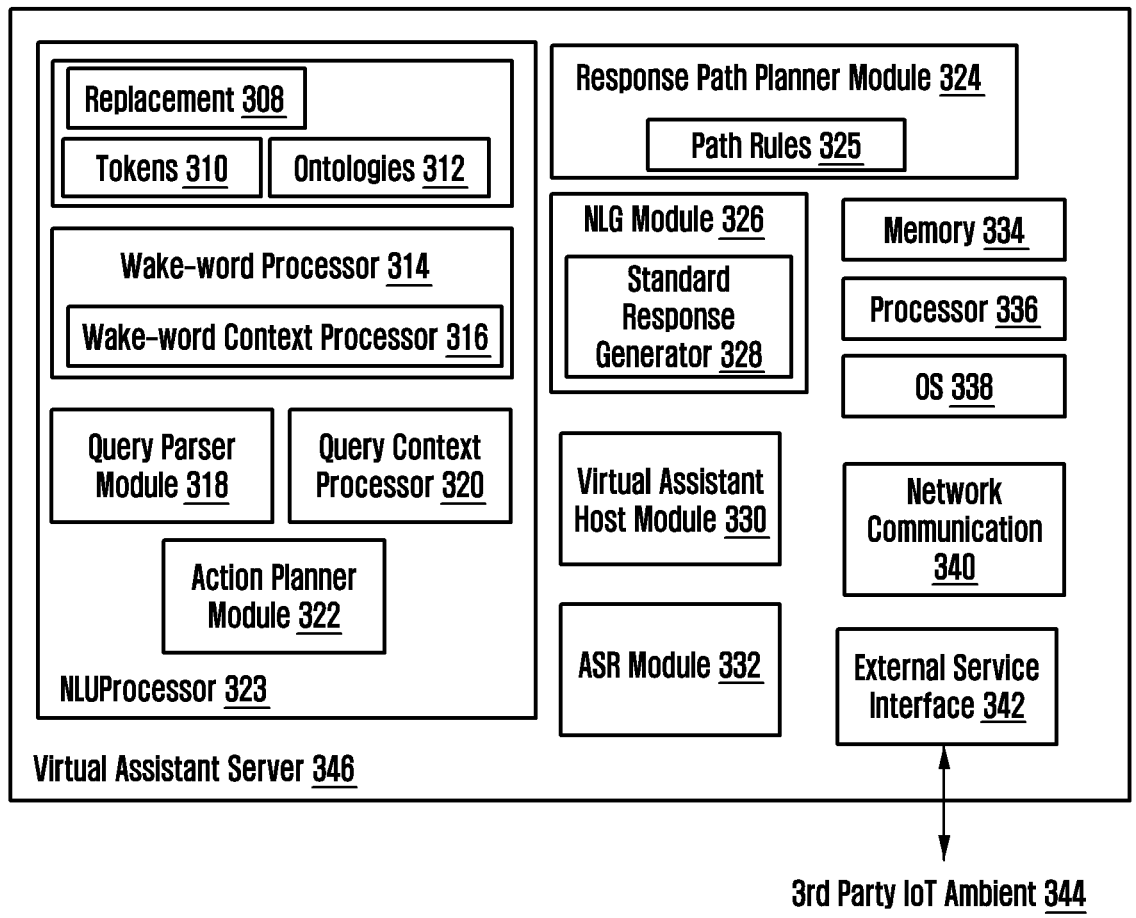
FIG. 3A illustrates an architecture for context association and personalization using a wake-word in virtual personal assistants, according to an embodiment.

FIG. 3A illustrates an architecture for context association and personalization using a wake-word in virtual personal assistants, according to an embodiment.

Figure 3B:
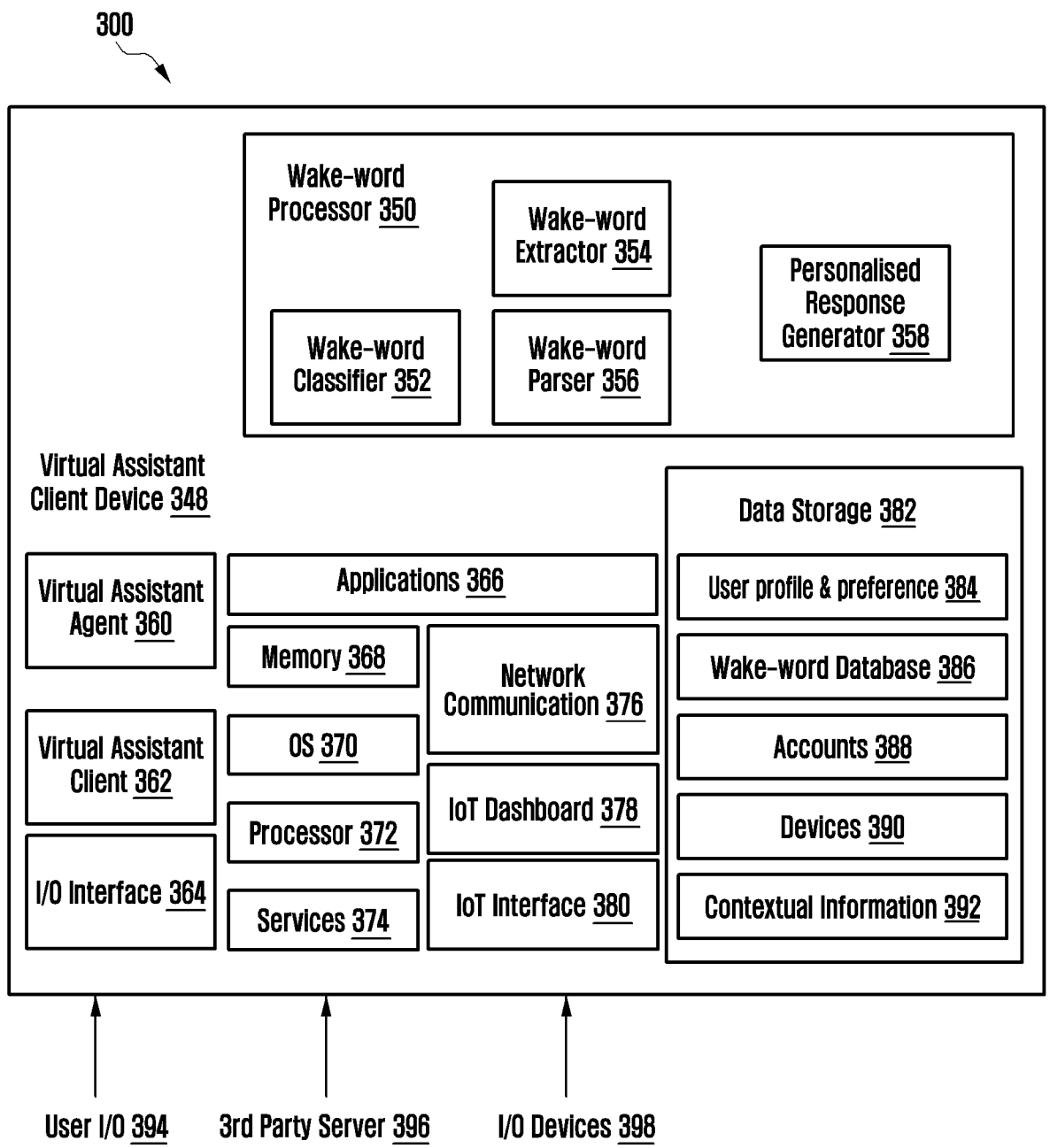
FIG. 3B illustrates context association and personalization using a wake-word in virtual personal assistants, according to an embodiment.

FIG. 3B illustrates an architecture for context association and personalization using a wake-word in virtual personal assistants, according to an embodiment.

The architecture illustrated in FIG. 3A may be in furtherance of the architecture illustrated in FIG. 3B.

Referring to FIGS. 3A-3B, the system 300 includes a virtual assistant client device 348, a user input/output 394, a third party server 396, a plurality of input/output devices 398, a virtual assistant server 346, a knowledge base/expert system 306 and a third party IoT ambient unit 344. In the present implementation, the virtual assistant server 346 includes an NLU processor 323, an NLG module 326, a virtual assistant host module 330, an ASR module 332, a memory 334, one or more processors 336, an OS 338, a response path planner module 324, a network communication 340 and an external service interface 342. The NLG module 326 includes a standard response generator 328. The NLU processor 223 further includes an NLU database 311, a wake-word processor 314, an action planner module 322, a query context processor 320 and a query parser module 318. The NLU database 211 further includes replacement 308, a plurality of tokens 310 and a plurality of ontologies 312. The wake-word processor 314 includes a wake-word context processor 316.

The virtual assistant client device 348 includes the wake-word processor 350, a personalized response generator 358, a virtual assistant agent 360, a virtual assistant client 362, an input/output interface 364, one or more applications 366, a memory 368 coupled to the processor 372, an OS 370, one or more services 374, a network communication 376, an IoT dashboard 378, and an IoT interface 380. The wake-word processor 350 further includes a wake-word classifier 352, a wake-word extractor 354 and a wake-word parser 356.

The user data is stored in the data storage 382 residing in the virtual assistant client device 348 instead of a separate server. The data storage 382 includes the user profile information and the user preference information 384. The data storage 382 further includes the wake-word database 386, the accounts information 388, the devices 390, and the contextual information 392.

FIG. 4 is a flowchart illustrating wake-word processing, classification and information retrieval of wake-words, according to an embodiment.

Referring to FIG. 4, at step 402, the user inputs a query to the virtual assistant device. At step 404, the query is received by the virtual assistant server. At step 406, this query is passed to the ASR module which is configured to process the incoming query. At step 408, the query is parsed by the query parser module for separating the wake-word from the user query. At step 410, the wake-word separated from the query is processed by the wake-word processor and rest of the user query is parsed separately. At step 412, the wake-word is classified by a wake-word classifier. At step 414, information is retrieved. At step 416, the system is configured to match the wake-word and a context. If the wake-word and the context match, the user receives a personalized response at step 418, otherwise the system is configured to return to step 402. At step 418, the wake-word context is produced from the classified information by the wake-word context processor. At step 420, the query context processor is configured to receive and process the query from the query parser module and to receive the processed wake-word from the wake-word context processor to generate the overall context of the query. Further, the query context processor is configured to combine the information received from the query parser module and the contextual information received from the wake-word context processor to interpret and generate an aggregated context combining both inputs. At step 422, a plurality of action steps are applied for retrieving the query response from at least one knowledge base.

Figure 5:
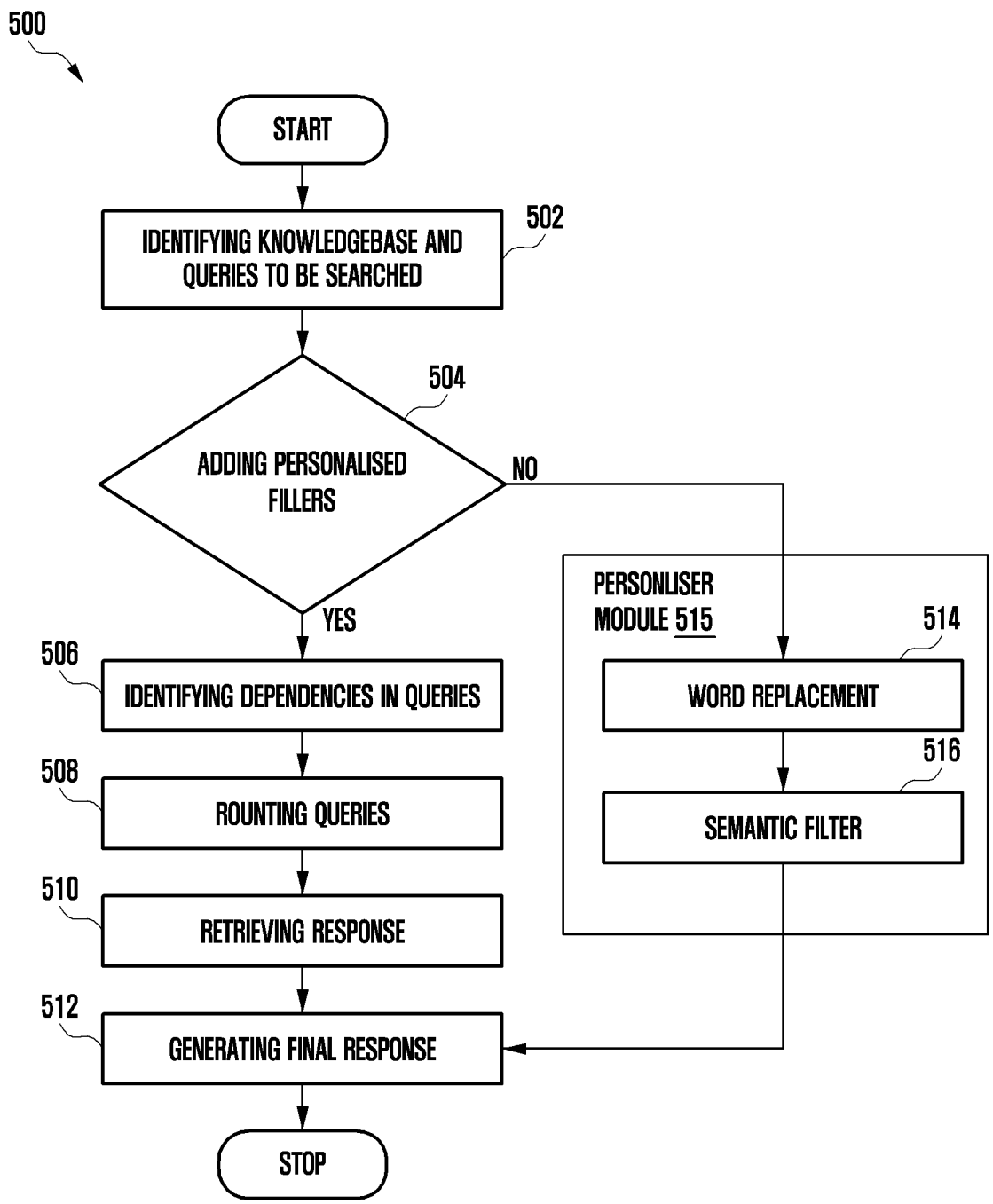
FIG. 5 is a flowchart illustrating usage of personalized fillers, according to an embodiment.

FIG. 5 is a flowchart illustrating the usage of personalized fillers, according to an embodiment. At step 502, a knowledge base and queries to be searched are identified. At step 504, the personalizer module 515 will choose a user's preferred word replacements in step 514 and prepare semantic fillers in step 516 to prepare the response while the query is being retrieved. General fillers may be used while the system is fetching the response to the query. At step 506, dependencies in the queries are identified, and the information is passed to the routing agent. At step 508, the queries are routed to the routing agent which is configured to prepare the routing plan for a search in knowledge base. At step 510, a response based on the routing plan is retrieved. At step 512, the final response that includes the personalized fillers is generated.

Figure 6:
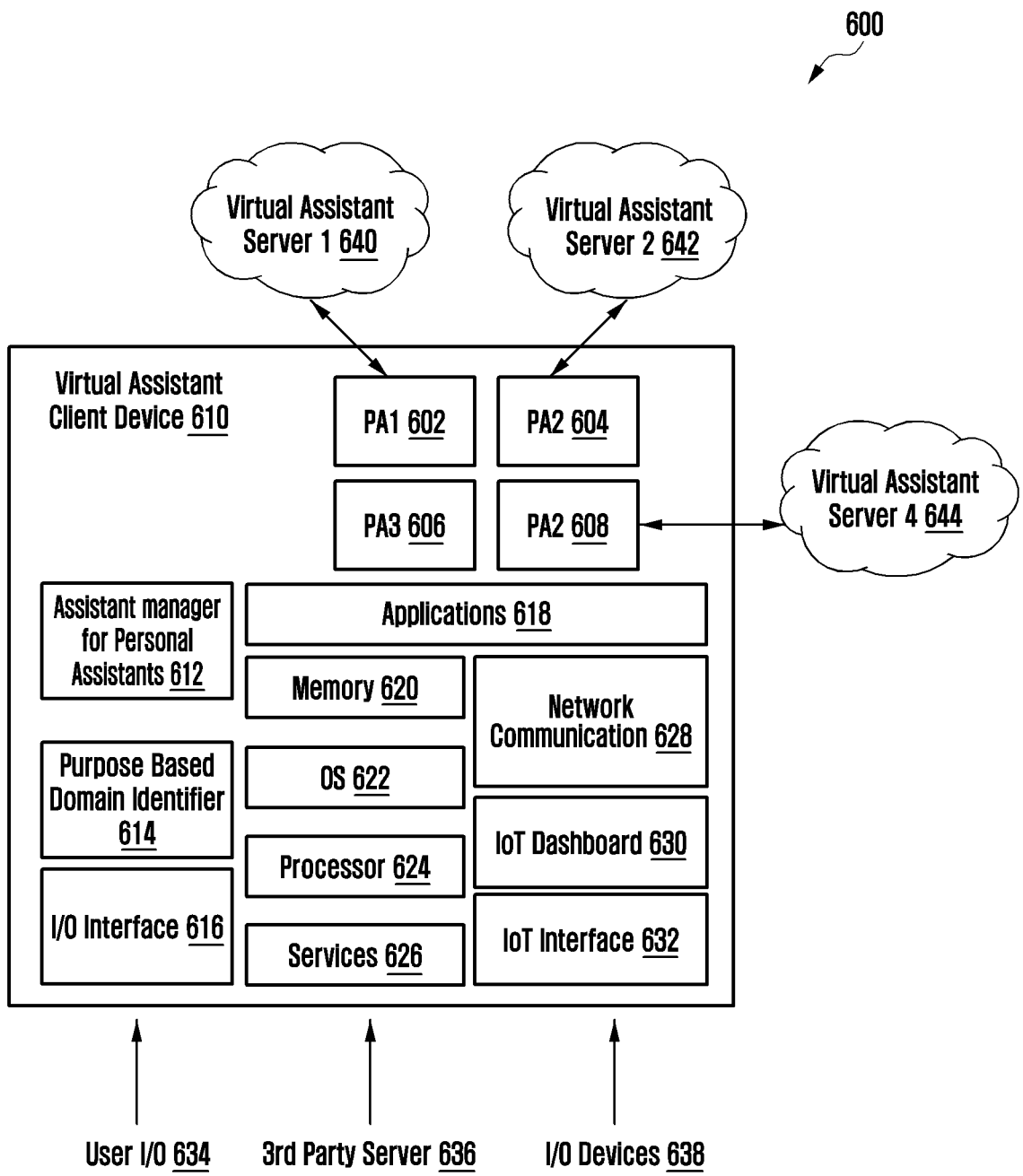
FIG. 6 illustrates a schematic block diagram of the architecture of choosing the appropriate virtual assistant from a plurality of virtual assistants, according to an embodiment.

FIG. 6 illustrates a schematic block diagram of the architecture of choosing the appropriate virtual assistant from a plurality of virtual assistants, according to an embodiment. The system 600 provides a virtual assistant client device 610, user input/output 634, third party server 636, and a plurality of input/output devices 638. The virtual assistant client device 610 includes a plurality of personal assistants namely personal assistant 1 (PA1) 602, personal assistant 2 (PA2) 604, personal assistant 3 (PA3) 606, or personal assistant 4 (PA4) 608 and a plurality of virtual assistant servers namely virtual assistant server 1 640, virtual assistant server 2 642, or virtual assistant server 4

644. The virtual assistant client device 610 further includes an assistant manager 612 for the plurality of personal assistants, a purpose based domain identifier 614, an input/output interface 616, one or more applications 618, a memory 620 coupled to the processor 624, an OS 622, one or more services 626, a network communication 628, an IoT dashboard 630, and an IoT interface 632. The assistant manager 612 is configured to define a plurality of wake-words for PA1 602, PA2 604, PA3 606, or PA4 608, wherein the plurality of personal assistants are associated with virtual assistant server 1 640, virtual assistant server 2 642, or virtual assistant server 3 644. The assistant manager 612 is further configured to receive a user query along with a wake-word, wherein the assistant manager interacts with PA1 602, PA2 604, PA3 606, or PA4 608. Further, the domain identifier 614 is configured to compare the performance of the plurality of virtual assistants and select the appropriate PA to respond to the user query. The performance of PA1 602, PA2 604, PA3 606, or PA4 608 includes comparing the historical performance of the PAs and the present performance of the PAs. Further, a wake-word classifier is configured to separate the wake-word from the user query and the assistant manager 612 is configured to transfer the separated user query to the selected PA1 602, PA2 604, PA3 606, or PA4 608. Further, the selected virtual assistant server 1 640, virtual assistant server 2 642, or virtual assistant server 3 644 is configured to process the user query and a decision agent is configured to retrieve a query response from at least one knowledge base based on a plurality of action steps. Further, a standard response generator is configured to generate a standard natural language response from the query response and a personalized response generator is configured to synthesize a personalized response from the standard natural language response using wake-word information and a wake-word context.

Figure 7:
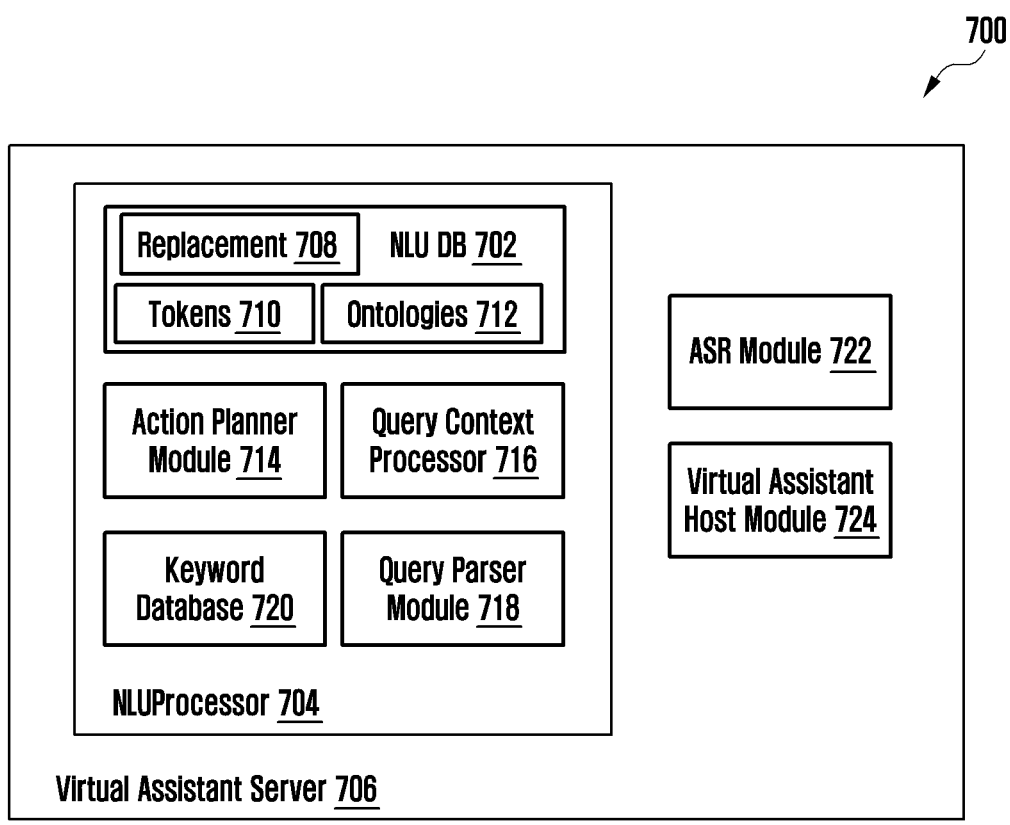
FIG. 7 illustrates a schematic block diagram of an architecture for diversifying wake-words, according to an embodiment.

FIG. 7 illustrates a schematic block diagram of the architecture of diversifying the wake-words, according to an embodiment.

Referring to FIG. 7, the system 700 provides a virtual assistant server 706. The virtual assistant server 706 includes an NLG processor 704, an ASR module 722 and a virtual assistant host module 724. The NLU processor 704 further includes an NLU database 702, an action planner module 714, a query context processor 716, a query parser module 718 and a keyword database 720. The NLU database includes a replacement module 708, a plurality of tokens 710 and a plurality of ontologies 712. The virtual assistant server 706 is configured to associate a plurality of wake-words with a plurality of domain specific keywords. The virtual assistant client device is configured to receive a user query comprising one of the domain specific keywords associated with the wake-word. The keyword database 720 is configured to update the user query with one of the domain specific keywords associated with the wake-word. Further, the virtual assistant server 706 is configured to process the user query and identify a domain knowledge base related to the domain specific keyword based on the processed user query. Further, a decision agent is configured to retrieve a query response from the domain knowledge base based on a plurality of action steps. Further, a standard response generator is configured to generate a standard natural language response from the query response and a personalized response generator is configured to synthesize a personalized response from the standard natural language response based on the domain specific keyword associated with the wake-word.

Figure 8A:
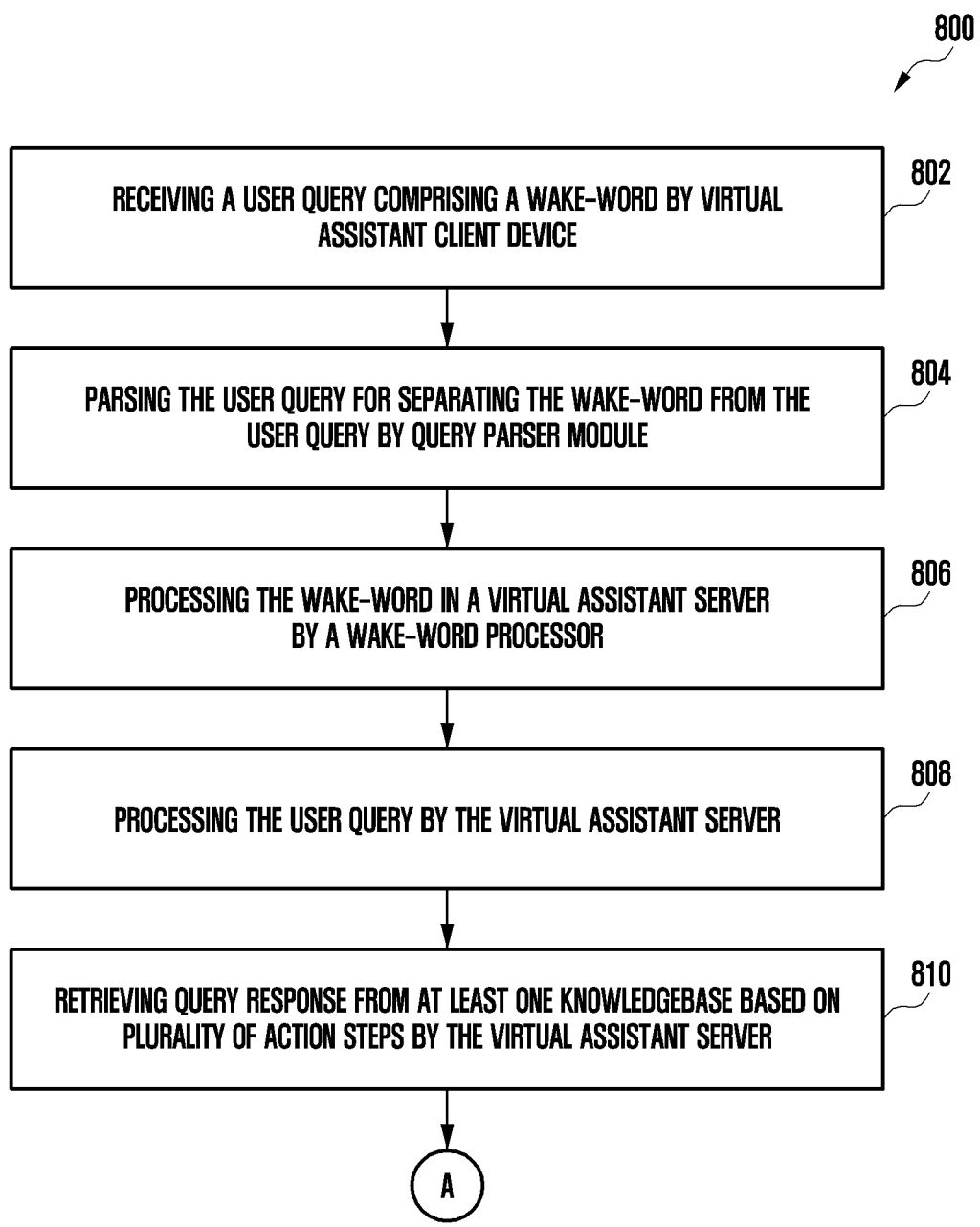
FIG. 8A is a flowchart illustrating a method of generating a personalized response from a virtual assistant, according to an embodiment.

FIG. 8A is a flowchart 800 illustrating a method of generating a personalized response from a virtual assistant, according to an embodiment.

Referring to FIG. 8A, at step 802, a user query comprising a wake-word is received by the virtual assistant client device 116. At step 804, the user query for separating the wake-word from the user query is parsed by a query parser module 164. At step 806, the wake-word is processed in a virtual assistant server 170 by a wake-word processor 150. At step 808, the user query is processed by the virtual assistant server 170. At step 810, a query response is retrieved from at least one knowledge base 172 based on a plurality of action steps by the virtual assistant server 170.

Figure 8B:
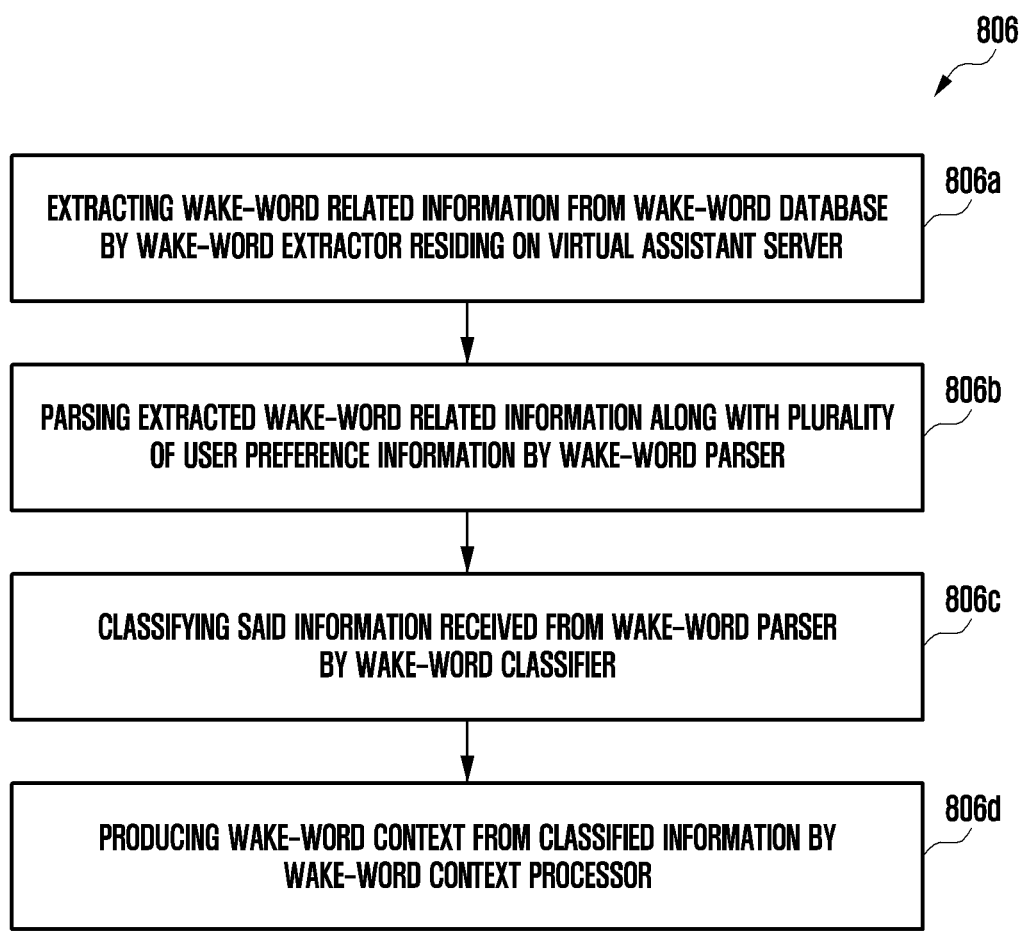
FIG. 8B is a flowchart illustrating a method of processing the wake-word in a virtual assistant server, according to an embodiment.

FIG. 8B is a flowchart 806 illustrating a method of processing the wake-word in a virtual assistant server, according to an embodiment.

Referring to FIG. 8B, at step 806a, wake-word related information is extracted from the wake-word database 108 by the wake-word extractor 158 residing on the virtual assistant server 170. At step 806b, extracted wake-word related information is parsed along with plurality of user preference information by the wake-word parser 156. At step 806c, the information received from the wake-word parser 156 is classified by the wake-word classifier 154. At step 806d, a wake-word context is produced from the classified information by the wake-word context processor 152.

Figure 8C:
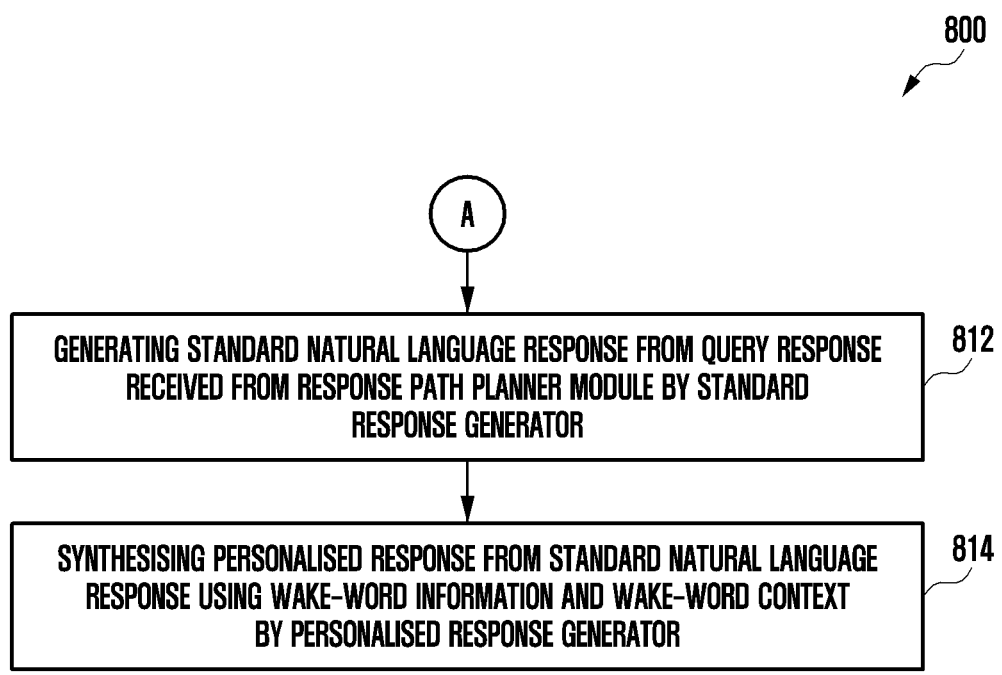
FIG. 8C is a flowchart illustrating a method of generating a personalized response from a virtual assistant, according to an embodiment.

FIG. 8C is a flowchart 800 illustrating a method of generating a personalized response from a virtual assistant, according to an embodiment.

Referring to FIG. 8C, at step 812, a standard natural language response is generated from a query response received from a response path planner module 178 by a standard response generator 182. At step 814, a personalized response is synthesized from the standard natural language response using the wake-word information and the wake-word context by a personalized response generator 184.

Figure 9:
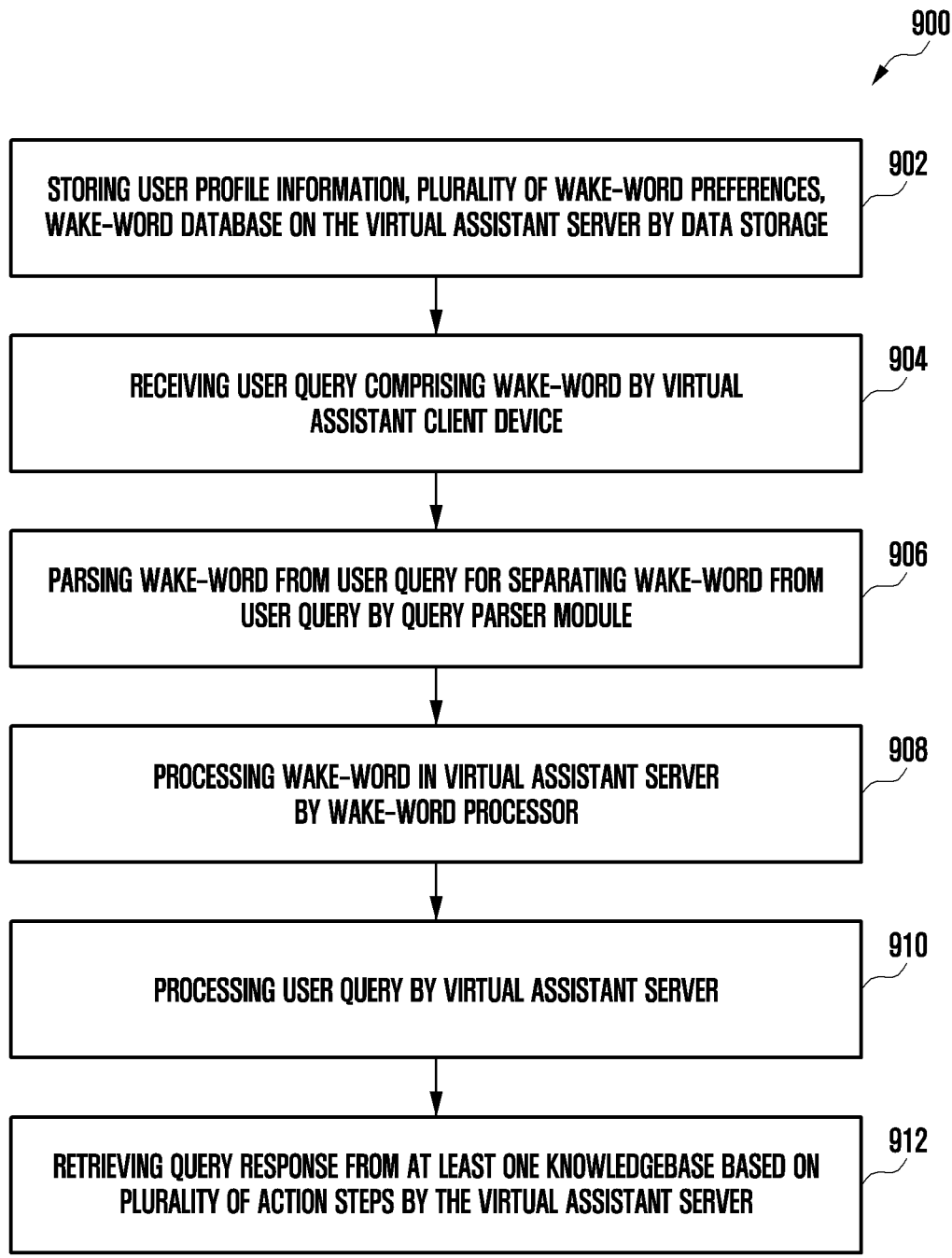
FIG. 9 is a flowchart illustrating a method of generating a personalized response from a virtual assistant, according to an embodiment.

FIG. 9 is a flowchart illustrating a method of generating a personalized response from a virtual assistant, according to an embodiment.

Referring to FIG. 9, at step 902, user profile information, a plurality of wake-word preferences, and a wake-word database on a virtual assistant server 230 are stored by a data storage 232. At step 904, a user query comprising a wake-word is received by a virtual assistant client device 268. At step 906, the wake-word is parsed from the user query for separating the wake-word from the user query by a query parser module 228. At step 908, the wake-word is processed in the virtual assistant server 230 by a wake-word processor 214. At step 910, the user query is processed by the virtual assistant server 230. At step 912, a query response is retrieved from at least one knowledge base 206 based on the plurality of action steps by the virtual assistant server 230.

Figure 10:
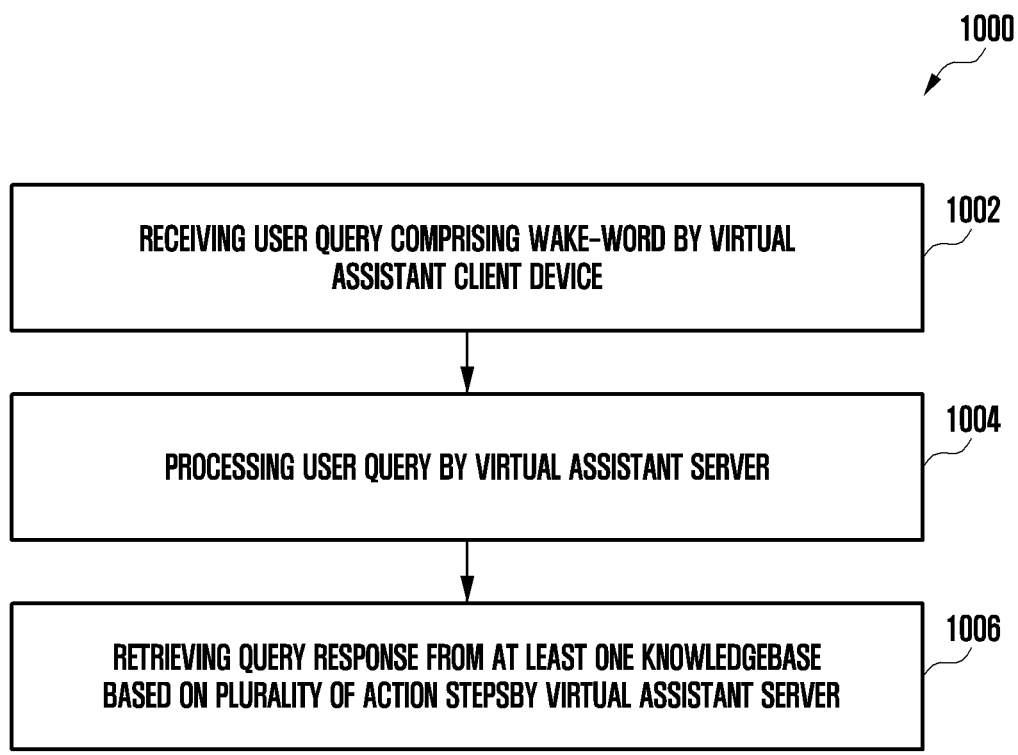
FIG. 10 is a flowchart illustrating a method of generating a personalized response from a virtual assistant, according to an embodiment.

FIG. 10 is a flowchart 1000 illustrating a method of generating a personalized response from a virtual assistant, according to an embodiment. At step 1002, the user query comprising the wake-word is received by the virtual assistant client device 348. At step 1004, the user query is processed by the virtual assistant server 346. At step 1006, the query response is received from at least one knowledge base 306 based on a plurality of action steps by the virtual assistant server 346.

Figure 11:
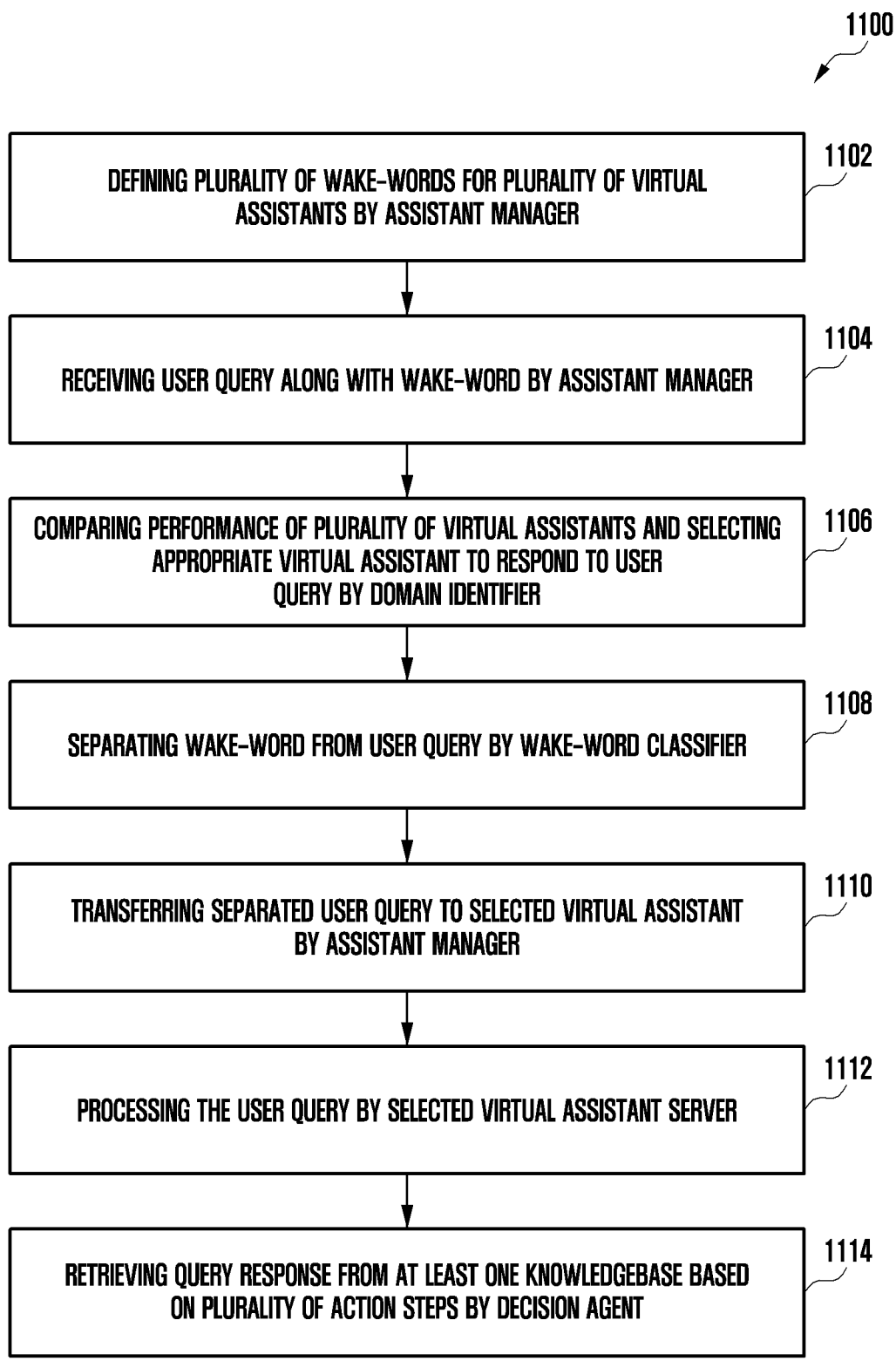
FIG. 11 is a flowchart illustrating a method of choosing the appropriate virtual assistant from a plurality of virtual assistants, according to an embodiment.

FIG. 11 is a flowchart illustrating a method of choosing an appropriate virtual assistant from a plurality of virtual assistants, according to an embodiment. At step 1102, a plurality of wake-words are defined for a plurality of personal assistants (PA1 602, PA2 604, PA3 606, or PA4 608) by an assistant manager 612, wherein the plurality of personal assistants are associated with virtual assistant servers (virtual assistant server 1 640, virtual assistant server 2 642, or virtual assistant server 3 644). At step 1104, a user query is received along with the wake-word by the assistant manager 612, wherein the assistant manager 612 interacts with the plurality of personal assistants. At step 1106, the performance of the plurality of personal assistants is compared and an appropriate virtual assistant is selected in response to the user query by a domain identifier 614. At step 1108, the wake-word is separated from the user query by a wake-word classifier. At step 1110, the separated user query is transferred to the selected personal assistant by the assistant manager 612. At step 1112, the user query is processed by the selected virtual assistant server. At step 1114, a query response is retrieved from at least one knowledge base based on a plurality of action steps by a decision agent.

Figure 12:
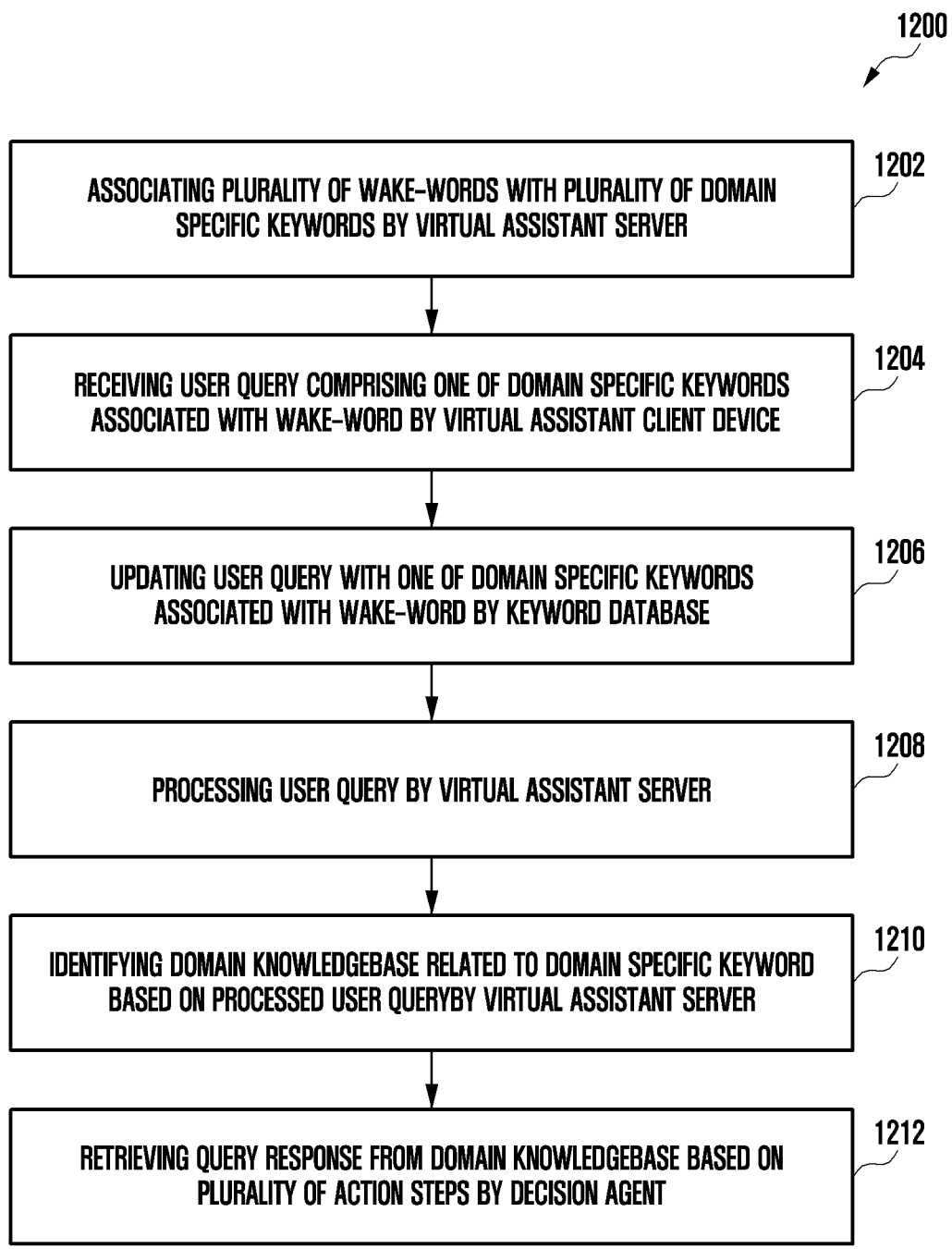
FIG. 12 is a flowchart illustrating a method of diversifying wake-words, according to an embodiment.

FIG. 12 is a flowchart illustrating a method of diversifying the wake-words, according to an embodiment. At step 1202, a plurality of wake-words are associated with a plurality of domain specific keywords by a virtual assistant server 706. At step 1204, a user query comprising one of the domain specific keywords associated with the wake-word is received by a virtual assistant client device. At step 1206, the user query is updated with one of the domain specific keywords associated with the wake-word by a keyword database 720. At step 1208, the user query is processed by the virtual assistant server 706. At step 1210, a domain knowledge base related to the domain specific keyword is identified based on the processed user query by the virtual assistant server 706. At step 1212, the query response is retrieved from the domain knowledge base based on the plurality of action steps by the decision agent.

Figure 13:
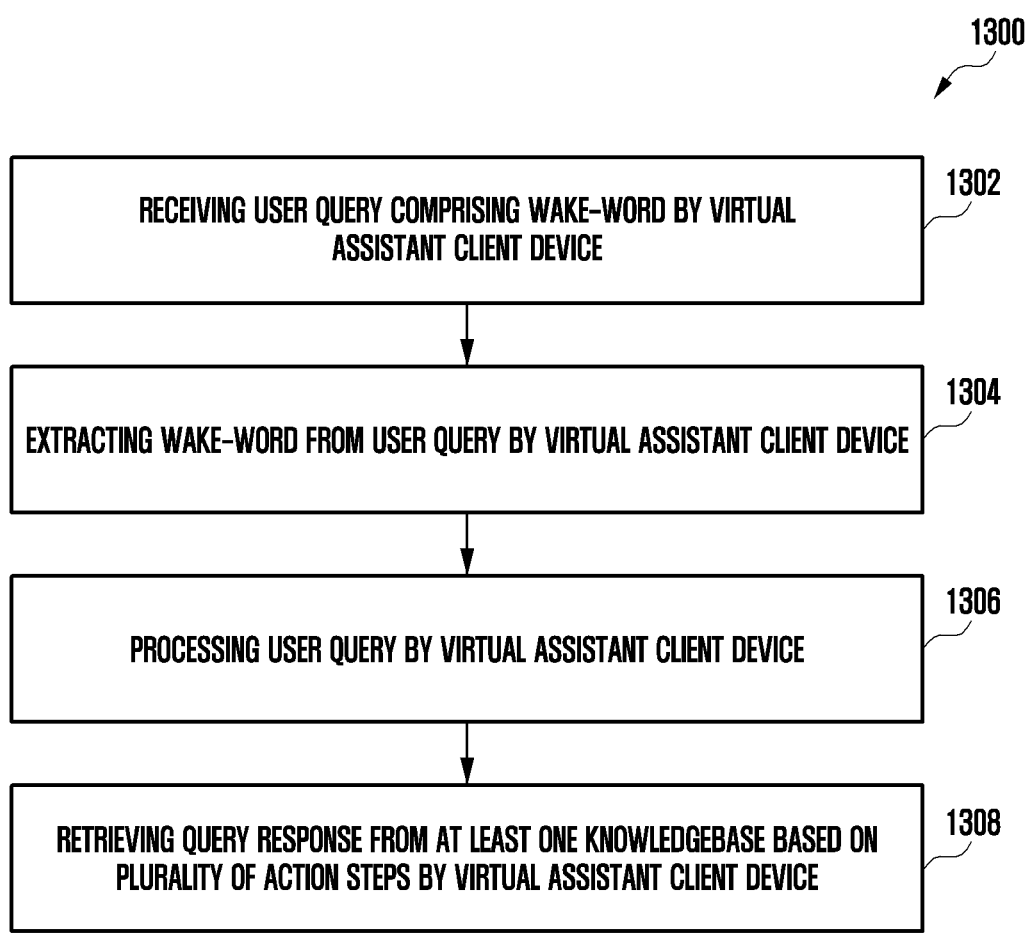
FIG. 13 is a flowchart illustrating a method of generating a personalized response from a virtual assistant on a virtual assistant client device, according to an embodiment.

FIG. 13 is a flowchart illustrating a method of generating a personalized response from a virtual assistant on a virtual assistant client device, according to an embodiment. At step 1302, a user query comprising a wake-word is received by a virtual assistant client device. At step 1304, the wake-word is extracted from the user query by the virtual assistant client device. At step 1306, the user query is processed by the virtual assistant client device. At step 1308, a query response is retrieved from at least one knowledge base based on a plurality of action steps by the virtual assistant client device.

Figure 14:
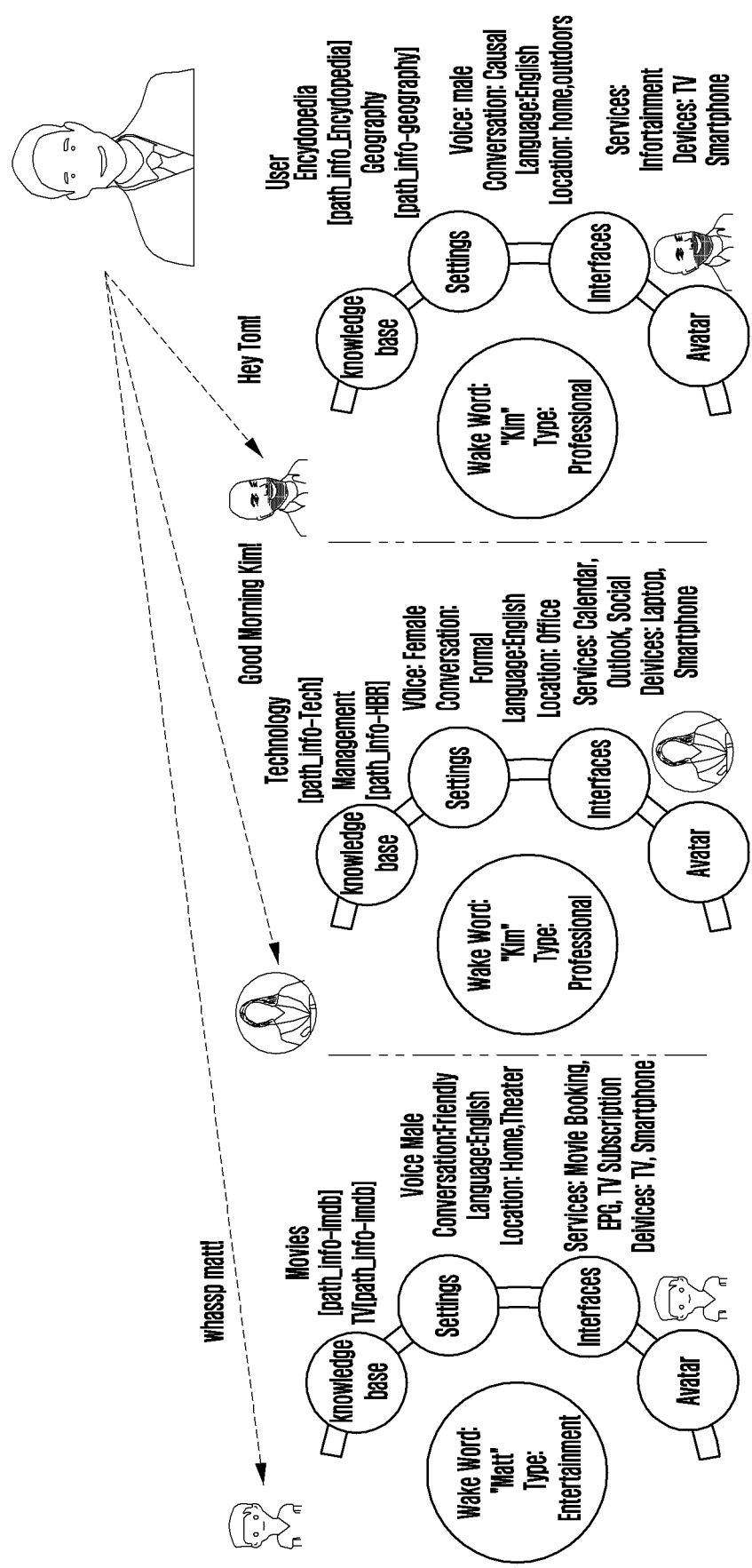
FIG. 14 illustrates a method for invoking a knowledge base/expert system and generating a personalized response based on a pre-defined wake word and a set of personalization parameters in a virtual personal assistant communication system, according to an embodiment.

FIG. 14 illustrates a method for invoking a knowledge base/expert system and generating a personalized response based on a pre-defined wake word and a set of personalization parameters in a virtual personal assistant communication system, according to an embodiment.

Referring to FIG. 14, a user creates an entry for mapping a plurality of wake-words with a plurality of knowledge bases. The user assigns the wake-word "Matt" with knowledge base movies, the wake-word "Kim" with a knowledge base technology and the wake-word "Tom" with a knowledge base encyclopedia. A wake-word based companion for the user is provided such that the user interacts with the virtual personal assistant using specified preferred language settings, avatars, voices and knowledge base/expert system settings. Further, a wake-word based invocation of a knowledge base/expert system for searching a query response and preparing a personalized response based on the wake-word settings is provided. In the first instance, the user may ask his personalized virtual personal assistant, "Whassup Matt". Here, the wake-word "Matt" is assigned the knowledge base "Movies" and the preferred settings includes a male voice, a friendly type of conversation, English language and a home location or a theatre location. Further, services include movie booking, an electronic program guide (EPG), and television (TV) subscriptions for devices such as TVs and smartphones. Further, an avatar may also be chosen appropriately.

The user may ask his personalized virtual personal assistant, "Good morning Kim". Here, the wake-word "Kim" is assigned the knowledge base "Technology" and the preferred settings include a female voice, a formal type of conversation, an English language and an office location. Further, services include a calendar program, an email program, and social programs for devices such as laptops and smartphones. The avatar may also be chosen appropriately.

The user may state to his personalized virtual personal assistant, "Hey Tom". Here, the wake-word "Tom" is assigned the knowledge base "Encyclopedia", and the preferred settings include a male voice, a casual type of conversation, an English language and a home location or an outdoors location. Further, the services include infotainment for devices such as TV and smartphone. Further, the avatar may also be chosen appropriately.

Figure 15:
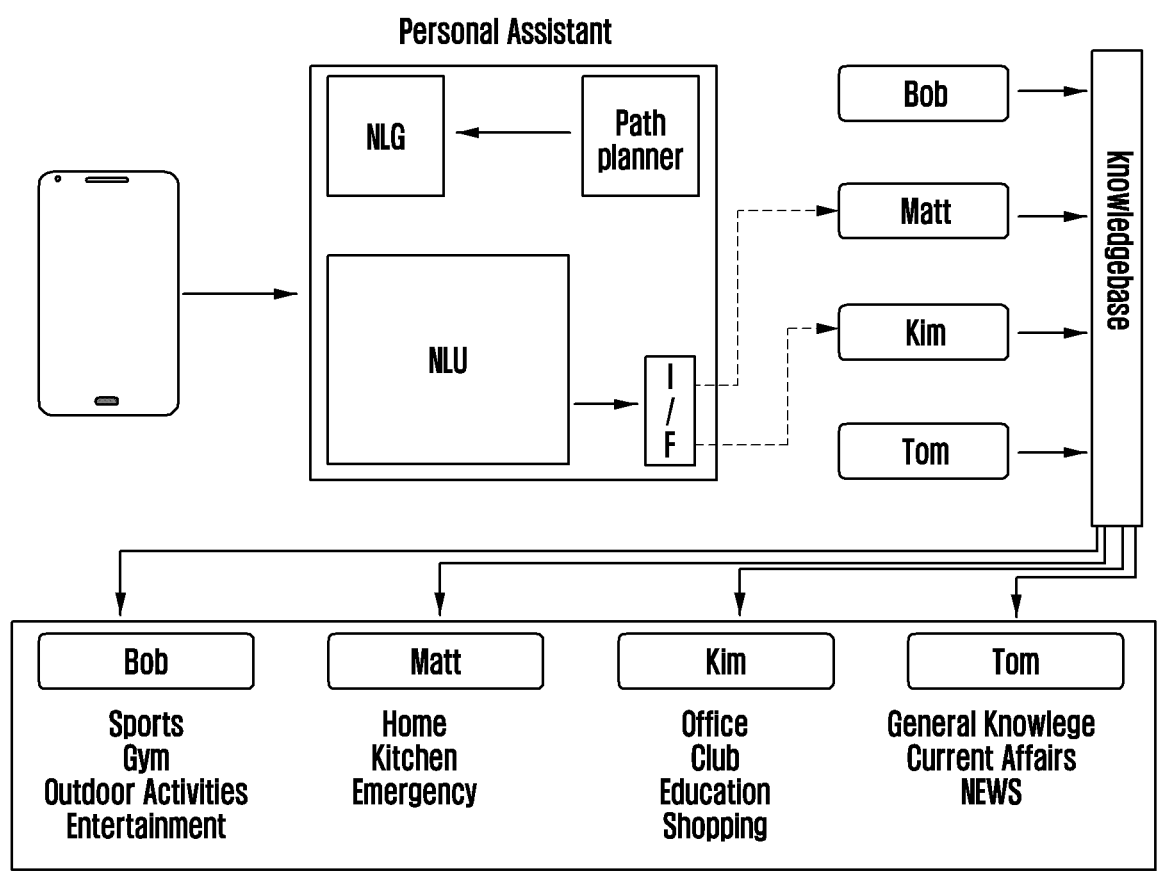
FIG. 15 illustrates a virtual personal assistant that may be aware of one or more contexts, according to an embodiment.

FIG. 15 illustrates a virtual personal assistant that may be aware of one or more contexts, according to an embodiment.

Referring to FIG. 15, a context is derived from a wake word, and a telephonic call is directed to the appropriate person. The user creates an entry for mapping a plurality of wake-words with a plurality of knowledge bases. The user assigns the wake-word "Kim" with the knowledge base that includes office, club, education and shopping. The wake-word "Matt" is assigned with the knowledge base that includes home, kitchen and emergency. The user asks his personalized virtual personal assistant, "Hi Kim. Make a call to John". John is the user's colleague from his or her office, and the John contact is tagged in an office contact list. The wake-word "Kim" is assigned to office, club, education and shopping. Further, in another scenario, the user asks his personalized virtual personal assistant, "Hi Matt. Make a call to John". In this case, John is the user's security guard at his house and his contact was tagged in a home contact list. The wake-word "Matt" is assigned to home, kitchen and emergency. A call is made only to the home contacts list. Further, filler sources like Facebook™, Instagram™, Twitter™, Netflix™ or Prime Video™ are used for fetching information such as likes, dislikes, tweets, and a watch history of the user.

In an embodiment, improved performance in the virtual personal assistant is explained herein. For instance, the user is searching for her favorite American football player, Kevin Smith. The user creates an entry for mapping a wake-word with a knowledge base. In this instance, the user assigns the wake-word "Bob" with knowledge base sports, gym, outdoor activities and entertainment. In one scenario, the user asks her personalized virtual personal assistant, "Hi Bob. Give me facts of Kevin Smith". The user is a fan of the club for which Kevin Smith used to play and the user assigned the wake-word "Bob" to the club. Thus, for the user to search about Kevin Smith, she just needs to use the wake-word "Bob" and the response will be accurate and faster for the user.

In another scenario, the user asks her personalized virtual personal assistant, "Hi, give me facts of Kevin Smith". In this case, the system searches a whole structure to find facts about all Kevin Smiths, which consumes a lot of time as it has to extract data from a plurality of knowledge bases to find the facts. Further, the filler sources, like Facebook™, Instagram™, Twitter™, Netflix™ or Prime Video™, are used for fetching the information such as likes, dislikes, tweets, and watch history.

In an embodiment, response personalization in the virtual personal assistant is explained herein. For instance, the user receives a personalized response for a query requested by him. The user creates an entry for mapping a plurality of wake-words with a plurality of knowledge bases. In this instance, the user assigns the wake-word "Tom" with knowledge base general knowledge, geography, history, current affairs, and news. Further, the user assigns the wake-word "Bob" with knowledge base entertainment, health, sports and gym, and the user assign the wake-word "Matt" with knowledge base home, kitchen and emergency. In one of the scenarios, the user asks his personalized virtual personal assistant, "Hi Tom. How is the weather today?" As the wake-word "Tom" was assigned with knowledge base general knowledge and geography, the wake-word "Tom" provides a reply by saying, "Hello Sir. Currently it's 38° Celsius in London, it's hot and there is no possibility for precipitation today, the humidity is 50% and the wind speed is 8 mph".

In another scenario, the user asks his personalized virtual personal assistant, "Hi Bob. How is the weather today?" As the wake-word "Bob" is assigned with knowledge base entertainment, health, sports and gym, the wake-word "Bob" provides a reply by saying, "Hi User. It's hot 38° Celsius, I know you don't like this weather very much and no rain today." In another scenario, the user asks his personalized virtual personal assistant, "Hi Matt. How is the weather today?" As the wake-word "Matt" is assigned with knowledge base home, kitchen and emergency, the wake-word "Matt" provides a reply by saying, "Hey. It's 38° Celsius and very hot in London, Dude, just chill at your home because there is no chance for precipitation today." Hence, based on the knowledge base assigned to the plurality of wake-words the virtual personal assistant provides a personalized response. Further, the filler sources, like Facebook™, Instagram™, Twitter™, Netflix™ or Prime Video™, are used for fetching information such as likes, dislikes, tweets, watch history of the user.

In an embodiment, insertion of conversational fillers in the virtual personal assistant is explained herein. For instance, the virtual personal assistant provides conversational fillers by providing additional information related to the query asked by the user. The user creates an entry for mapping a wake-word with a knowledge base. In this instance, the user assigns the wake-word "Bob" with knowledge base sports, gym, outdoor activities and entertainment. In one of the scenarios, the user asks his personalized virtual personal assistant, "Hi Bob. Who won the football game last night?" After the query was received, the system starts searching the result for the query. Since "Bob" wake word was assigned to the sports category, the system starts communicating other facts about the match with the user to engage the user.

In another scenario, the user asks his personalized virtual personal assistant, "Hi, who won the football game last night". In this case, the system starts searching for the result of the query and the user has to wait for the result. There is no communication between the user and virtual assistant until the result comes. Further, filler sources, like Facebook™, Instagram™, Twitter™, Netflix™ or Prime Video™, are used for fetching information such as likes, dislikes, tweets, and watch of the user.

In an embodiment, a security purpose in the virtual personal assistant is explained herein. The user creates an entry for mapping a wake-word with a knowledge base. In this instance, the user assigns the wake-word "Matt" with knowledge base police, fire, ambulance, banking, and rescue. In one of the scenarios, the user is in danger because a gun carrying thief wanted money in her account. The user handles this situation smartly by telling the thief, "Please don't kill me, I am "Matt" and I will transfer my money to your account". "Matt" is a personalized wake word created by the user and it is assigned to emergency contacts like police, fire, ambulances, banking and rescue. The user's virtual personal assistant who was assigned the wake-word "Matt" is alerted and understands the entire scenario. Hence, the location information of the user is sent to the police, all banking transactions are blocked and a false message for money transferred is created. The virtual personal assistant generates a false response or does not produce any response at all. Hence, in such cases, the virtual personal assistant works smartly and generates a personalized response based on the situation and the wake-words invoked. Further, filler sources, like Facebook™, Instagram™, Twitter™, Netflix™ or Prime Video™, are used for fetching information such as likes, dislikes, tweets, and watch history of the user.

In an embodiment, using the same virtual assistant on different devices is explained herein. In this instance, the user assigns the wake-word "Bob" with knowledge base entertainment, health, sports and gym. The user asks his personalized virtual personal assistant, "Hi Bob. I am bored, play a good video". The user had the same wake-word "Bob" in three devices in his vicinity and all three devices will wake when hearing the "Bob" wake word and send the query to the cloud for further processing. In the cloud, as the same query is received from three different devices using the same account of the user, the best suitable device will receive a reply. When the user wants to listen to music, a speaker is selected to play music. Hence, in such scenarios, the best suitable device present (i.e., speaker) in the vicinity of the user is selected based on the user query (i.e., "play music"). Further, filler sources like Facebook™, Instagram™, Twitter™, Netflix™ or Prime Video™ are used for fetching information such as likes, dislikes, tweets, and watch history of the user.

In an embodiment, different virtual assistants on different devices is explained herein. In this instance, the user assigns the wake-word "Tom" with knowledge base entertainment, health, sports and gym. In this case, different virtual assistants on different devices are explained. Each device has a different virtual assistant. Here each virtual assistant is associated with different wake-words. The PA1 is associated with wake-words Bob, Matt, Kim, and Tom. The user has multiple virtual assistants in different devices around him. The user asks his personalized virtual personal assistant, "Hi Tom. Play some music". As the user has multiple virtual assistant enabled devices and he has assigned wake-word "Tom" to one of them, only the virtual assistant with "Tom" registered as the wake-word will be invoked. That is, only the cloud related to the query starts processing and its corresponding device starts responding. Further, filler sources, like Facebook™, Instagram™, Twitter™, Netflix™ or Prime Video™, are used for fetching information such as likes, dislikes, tweets, and watch history of the user.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for generating a personalized response from a virtual assistant, the method comprising:

receiving a user query including a wake-word;
replacing unstructured inputs included in the user query with a machine-comprehendible structured form;
separating the wake-word and a remaining portion of the user query;
sending the wake-word to a wake-word processor;
parsing the remaining portion of the user query separately from the wake-word;
retrieving a query response from at least one knowledge base based on the wake-word;
generating a standard natural language response from the query response; and
synthesizing a personalized response from the standard natural language response based on the wake-word,
wherein retrieving the query response further comprises:
receiving a plurality of action steps from an action planner module;
searching for an appropriate knowledge base from the user query;
extracting the query response to the user query from the searched appropriate knowledge base;
instructing the query response to be sent to a response path planner module;
searching the user query in a plurality of knowledge bases;
preparing a routing plan for searching the query response in one of the plurality of knowledge bases; and
routing the user query to the appropriate knowledge base for retrieving the query response.

2. The method of claim 1, further comprising:
extracting wake-word related information from a wake-word database;
parsing the extracted wake-word related information along with a plurality of user preference information;
classifying information received from a wake-word parser; and
producing a wake-word context from the classified information.

3. The method of claim 2, further comprising:
generating a user query context from the wake-word context and a separated user query; and
computing the query response based on the user query context.

4. The method of claim 2, further comprising assigning a plurality of tags to information received from the wake-word database.

5. The method of claim 2, further comprising:
mapping the wake-word and the wake-word context; and
prompting a user to choose an appropriate wake-word when the wake-word and the wake-word context are not mapped.

6. The method of claim 1, further comprising:
inputting a plurality of wake-words along with a plurality of wake-word parameters, wherein the plurality of wake-word parameters are set based on a plurality of user preference information including, at least one of, a response type, a voice of a response, a language, an avatar, or a filler source;
creating an entry for the plurality of wake-words along with the plurality of wake-word parameters and a plurality of knowledge base information in a wake-word database, wherein the plurality knowledge base information includes, at least one of, a profile identification (ID), the wake-word, or the knowledge base;
mapping the plurality of wake-words along with the plurality of knowledge bases;
storing the mapped plurality of wake-words with the plurality of knowledge bases in data storage at a server.

7. The method of claim 1, wherein synthesizing the personalized response further comprises:
interacting with a server or a wake-word processor for extracting user preference information related to the wake-word;
receiving the user preference information;
converting the received user preference information along with a plurality of semantic fillers into a personalized response;
generating the personalized response to speech in, at least one of, a desired voice, action, form, or text; and
preparing the plurality of semantic fillers and choosing a user's preferred words for outputting the personalized response.

8. The method of claim 1, further comprising:
extracting wake-word information from a server through a plurality of application program interface (API) calls; and
returning the wake-word information and user preference information to a wake-word parser in response to one of the plurality of API calls,
wherein a data structure of the wake-word information and the user preference information is a standard data format.

9. The method of claim 1, wherein a plurality of wake-words are assigned corresponding to at least one mode from among a plurality of modes,
wherein the plurality of modes include a general mode and a private mode, and
wherein the private mode includes:
initializing the private mode based on a user query context;
changing at least one of a privacy setting, a response setting or a response type;
determining private information of a user and excluding the private information of the user in the query response;
determining not to interrupt the user when a private moment is detected; and
determining not to disclose the private information of the user with the virtual assistant.

10. An electronic device for generating a personalized response from a virtual assistant, the electronic device comprising:
a network communication circuitry;
a memory; and
at least one processor configured to:
receive a user query including a wake-word;
replacing unstructured inputs included in the user query with a machine-comprehendible structured form;
separating the wake-word and a remaining portion of the user query;
sending the wake-word to a wake-word processor;
parsing the remaining portion of the user query separately from the wake-word;
retrieve a query response from at least one knowledge base based on the wake-word;
generate a standard natural language response from the query response; and
synthesize a personalized response from a standard natural language response based on the wake-word,
wherein retrieving the query response further comprises:
receiving a plurality of action steps from an action planner module;

searching for an appropriate knowledge base from the user query;

extracting the query response to the user query from the searched appropriate knowledge base;

instructing the query response to be sent to a response path planner module;

searching the user query in a plurality of knowledge bases;

preparing a routing plan for searching the query response in one of the plurality of knowledge bases; and routing the user query to the appropriate knowledge base for retrieving the query response.

11. The electronic device of claim 10, wherein the at least one processor is further configured to:

parse the user query to separate the wake-word from the user query;

process the wake-word;

extract wake-word related information from a wake-word database;

parse the extracted wake-word related information along with a plurality of user preference information;

classify information received from a wake-word parser; and produce a wake-word context from the classified information.

12. The electronic device of claim 11, wherein the at least one processor is further configured to:

generate a user query context from the wake-word context and separated user query; and compute the query response based on the user query context.

13. The electronic device of claim 11, wherein the at least one processor is further configured to:

extract wake-word information from a server through a plurality of application program interface (API) calls; and receive the wake-word information and user preference information, wherein a data structure of the wake-word information and the user preference information is a standard data format.

14. The electronic device of claim 13, wherein the server is configured to return the wake-word information and the user preference information to the wake-word parser in response to one of the plurality of API calls.

15. The electronic device of claim 10, wherein the at least one processor is further configured to:

receive a plurality of wake-words along with a plurality of wake-word parameters, wherein the wake-word parameters are set based on a plurality of user preference information including, at least one of, a response type, a voice of a response, a language, an avatar, or a filler source;

create an entry for the plurality of wake-words along with the plurality of wake-word parameters and a plurality of knowledge base information in a wake-word database, wherein the plurality knowledge base information includes, at least one of, a profile identification (ID), the wake-word, or the knowledge base;

map the plurality of wake-words along with the plurality of knowledge bases; and store the mapped plurality of wake-words with the plurality of knowledge bases.

16. The electronic device of claim 10, wherein the at least one processor is further configured to:

interact with a server or a wake-word processor to extract user preference information related to the wake-word;

receive the user preference information;

convert the received user preference information along with a plurality of semantic fillers into a personalized response; and generate the personalized response to speech in, at least one of, a desired voice, action, form, or text.

17. The electronic device of claim 10, wherein the at least one processor is further configured to assign a plurality of tags to information received from a wake-word database.

18. The electronic device of claim 10, wherein a plurality of wake-words are assigned corresponding to at least one mode from among a plurality of modes.

19. The electronic device as claimed in claim 18, wherein the plurality of modes include a general mode and a private mode, and wherein the private mode is configured to:

initialize the private mode based on a user query context;

change at least one of a privacy setting, a response setting and a response type;

determine private information of a user and excluding the private information of the user in the query response;

determine not to interrupt the user when a private moment is detected; and determine not to disclose the private information of the user with the virtual assistant.

* * * * *